(12) United States Patent
Yanagida et al.

(10) Patent No.: US 6,916,139 B2
(45) Date of Patent: Jul. 12, 2005

(54) DRILL

(75) Inventors: Kazuya Yanagida, Anpachi-gun (JP);
Shoji Takiguchi, Anpachi-gun (JP);
Katsuyuki Suzuki, Anpachi-gun (JP);
Takeshi Inoue, Anpachi-gun (JP)

(73) Assignee: Mitsubishi Materials Corporation, Tokyo (JP)

( * ) Notice: Subject to any disclaimer, the term of this patent is extended or adjusted under 35 U.S.C. 154(b) by 375 days.

(21) Appl. No.: 10/105,411

(22) Filed: Mar. 26, 2002

(65) Prior Publication Data

US 2003/0039522 A1 Feb. 27, 2003

(30) Foreign Application Priority Data

| Jul. 10, 2001 | (JP) | ................................ | P2001-209585 |
| Jul. 10, 2001 | (JP) | ................................ | P2001-209586 |
| Jul. 10, 2001 | (JP) | ................................ | P2001-209587 |
| Jul. 10, 2001 | (JP) | ................................ | P2001-209588 |
| Jan. 30, 2002 | (JP) | ................................ | P2002-022219 |

(51) Int. Cl.$^7$ ............................................. B23B 51/02
(52) U.S. Cl. ...................................... 408/230; 408/227
(58) Field of Search ................................ 408/227, 229, 408/230, 57, 59, 144

(56) References Cited

U.S. PATENT DOCUMENTS

| 2,966,081 | A |   | 12/1960 | Kallio et al. |            |
| 4,744,705 | A | * | 5/1988  | Imanaga       | ..... 408/230 |
| 5,486,075 | A | * | 1/1996  | Nakamura et al. | ..... 408/230 |
| 6,132,149 | A | * | 10/2000 | Howarth et al. | ..... 408/230 |
| 6,309,149 | B1| * | 10/2001 | Borschert et al. | ..... 408/230 |
| 2002/0044843 | A1 |   | 4/2002  | Suzuki et al. |            |
| 2003/0012613 | A1 |   | 1/2003  | Takiguchi et al. |       |

FOREIGN PATENT DOCUMENTS

| EP | 0 320 881 A2 |   | 6/1989  |            |
| EP | 0 332 437 A2 |   | 9/1989  |            |
| JP | 60/114407    |   | 6/1985  |            |
| JP | 89211        | * | 4/1988  | ..... 408/230 |
| JP | 63/089211    |   | 4/1988  |            |
| JP | 318208       | * | 12/1988 | ..... 408/230 |
| JP | 5708         | * | 1/1989  | ..... 408/230 |
| JP | 2/124208     |   | 5/1990  |            |
| JP | 2000/198011  |   | 7/2000  |            |

OTHER PUBLICATIONS

Specification, Claims, Abstract and Drawings of U.S. Appl. No. 10/650,683, Drill and Production Method Thererof.

* cited by examiner

*Primary Examiner*—Daniel W. Howell
(74) *Attorney, Agent, or Firm*—Rader, Fishman & Grauer PLLC

(57) ABSTRACT

The present invention provides a drill comprising: a drill main body rotatable about an axis of rotation, and having a tip end with a tip flank and a shank; a chip discharge flute formed on a periphery of the drill main body, and extending from the tip end toward the shank of the drill main body; and a cutting edge formed along an intersecting ridge where a wall surface of the chip discharge flute facing in the direction of drill rotation intersects the tip flank of the drill main body, wherein the cutting edge comprises a convex cutting edge toward the periphery and a concave cutting edge smoothly extending from the convex cutting edge. When drilling work is performed with this drill, the chips are generally curled and can be smoothly discharged without being excessively abutted against the wall surface of the chip discharge flute; consequently, the chips can be smoothly discharged, and the drill main body is subjected to less frictional resistance, which leads to less wear on the drill and less driving torque for drilling. Therefore, the drill life can be preferably extended even under severe drilling conditions, such as during high speed drilling, and smooth and stable drilling can be performed.

18 Claims, 11 Drawing Sheets

DRILL

BACKGROUND OF THE INVENTION

1. Field of the Invention

This invention relates to a drill which enables performance of smooth and stable drilling even under severe conditions, specifically, such as high speed and dry drilling.

2. Background Art

A drill designed to be suitable for use under severe drilling conditions in which no or small amounts of cutting lubricant is used is disclosed, for example, in Japanese Unexamined Patent Application, First Publication, No. 2000-198011. The drill disclosed in the above Publication comprises: a center cutting edge extending from a chisel at the tip of a drill main body; a major cutting edge extending outward from the end of the center cutting edge; an outer corner cutting edge obliquely extending in the direction opposite to the direction of drill rotation from the end of the major cutting edge at a certain radius of rotation; and a leading edge consisting of a chip discharge flute and a margin portion, wherein a straight or curved chamfer is formed on the leading edge so as to be connected to the corner edge. The cross angle between the outer corner edge and the margin portion at the periphery of the drill main body is set as an obtuse angle so that the cutting edge at the periphery is prevented from being broken even under severe drilling conditions.

A drill in which a portion of the cutting edge near the periphery is slightly inclined in the direction opposite to the direction of drill rotation as in the above drill is disclosed in Japanese Examined Patent Application, Second Publication, No. Hei 4 -46690. In this drill, a primary straight ridge and a secondary straight ridge located on the outer portion of the cutting edge form a convex shape, i.e., an approximate V-shape, when viewed in the axis of rotation. In addition, when viewed in the axis of rotation, the inner portion of the cutting edge is also substantially formed in a V-shape, which consists of a straight chisel edge formed by thinning and a straight connection ridge connected to the straight chisel edge; furthermore, a portion connecting the secondary straight ridge to a inner ridge is formed as a rounded concave.

A drill in which the cutting edge is formed in a concave shape, when viewed in the axis of rotation, as in the above drill is disclosed in Japanese Unexamined Patent Application, First Publication, No. Sho 61-58246, etc. In this drill, a radial rake angle of the cutting edge at the periphery is set to zero or a positive value.

As disclosed in Japanese Patent No. 2674124, a drill comprising: a drill main body rotatable about an axis of rotation, and having a tip end with a tip flank and a shank; a chip discharge flute formed on a periphery of the drill main body, and extending from the tip end toward the shank of the drill main body; and a cutting edge formed along an intersecting ridge where a wall surface of the chip discharge flute facing in the direction of drill rotation intersects the tip flank of the drill main body, is known.

A drill such as disclosed in Japanese Unexamined Patent Application, First Publication, No. Sho 61-58246, in which the outer portion of the cutting edge is formed in a rounded concave shape, enables performance of smooth and stable drilling, under normal drilling conditions, in which curled chips are smoothly discharged; however, under severe drilling conditions, the service life of the drill tends to be substantially shortened due to breakage or chipping of the cutting edge at the periphery due to lack of strength of the drill main body since the cross angle between the cutting edge at the periphery and the margin portion is an acute angle.

On the other hand, in such a drill in which the outer portion of the cutting edge is formed in a convex shape, i.e., in a V-shape, when viewed in the axis of rotation, and the cutting edge near the periphery is slightly inclined in the direction opposite to the direction of drill rotation, as disclosed in Japanese Unexamined Patent Application, First Publication, No. 2000-198011 or Japanese Examined Patent Application, Second Publication, No. Hei 4-46690, it is possible to prevent breakage or chipping of the cutting edge by making the cross angle between the cutting edge at the periphery and the margin portion to be an obtuse angle; however, the chips produced by the cutting edge are broken at the tip of the V-shape, and they tend to twine with each other and to clog the chip discharge flute under high speed drilling conditions. In addition, because the chips which are produced by the cutting edge and flow to the chamfer of the wall of the chip discharge flute or to outside the V-shape tend to move out of the drill, the curling performance of the chips are generally degraded and non-curled chips are strongly pressed against the trailing wall surface of the chip discharge flute, which applies a great frictional resistance to the drill main body, which leads to rapid wear of the drill and to increase in a driving torque applied to the drill for drilling.

When a thinning cutting edge such as a chisel edge connected to the chisel or a center cutting edge is formed in the inner portion of the cutting edge by applying thinning, the chips produced by the thinning cutting edge flow along the bottom surface of the thinning portion extending from the wall of the chip discharge flute to the tip end and which is formed by thinning. In a drill such as disclosed in Japanese Examined Patent Application, Second Publication, No. Hei 4-46690, in which the thinning portion is formed by simply cutting the end portion of the wall of the chip discharge flute to define a V-shaped recess, the chips produced by the thinning cutting edge tend to clog at the bottom of the V-shaped recess, and even to cause fusion since the chips are clogged and not cooled, specifically under high speed and dry drilling conditions. The bottom of the V-shaped recess of the thinning portion obliquely extends from the wall of the chip discharge flute toward the inner end of the cutting edge. When the oblique angle of the bottom is small, the bite performance of the drill tip on a workpiece may be degraded and the driving torque for drilling may be increased due to increase in a thrust force, because the innermost point of the thinning cutting edge, i.e., of the cutting edge is positioned far outside from the center of the tip flank, and thus the chisel becomes wide. On the other hand, when the oblique angle of the bottom is large, the tip angle of the drill main body measured in cross section along the bottom becomes small, which may lead to breakage of the drill tip under high speed and dry drilling conditions.

In a drill such as disclosed in Japanese Unexamined Patent Application, First Publication, No. 2000-198011 or Japanese Patent No. 2674124, the rake angle of the cutting edge, when viewed in cross section perpendicular to the cutting edge, i.e., the orthogonal rake angle of the cutting edge is generally designed so as to gradually increase from the center of the drill main body to the periphery in accordance with the radius of rotation (See, for example, drills E and F referred to below and FIG. 12). In a drill disclosed in Japanese Patent No. 2674124, the cutting edge tends to experience chipping or breakage and rapid flank wear because the rake angle is the largest at the periphery, in contrast, the included angle of the cutting edge is the smallest, which decreases strength of the cutting edge at the periphery where the distance from the axis of rotation is the largest, the cutting speed is the highest, and consequently the cutting condition is the most severe in high speed and dry drilling.

On the other hand, in a drill disclosed in Japanese Unexamined Patent Application, First Publication, No. 2000-198011, in which outer corner cutting edge obliquely extending in the direction opposite to the direction of drill rotation from the end of the major cutting edge is formed, the orthogonal rake angle of the cutting edge is decreased as the radial rake angle of the cutting edge is increased at the outer corner cutting edge, and the orthogonal rake angle is increase in accordance with the radius of rotation; therefore, the orthogonal rake angle must be set to a relatively small value all along the cutting edge in order to ensure a sufficient strength of the cutting edge even under the severe conditions as described above. In this case, the cutting ability is degraded all along the cutting edge, and thus the cutting resistance is increased, which may cause a substantially shortened service life of the drill due to rapid wear under the severe cutting conditions such as high speed and dry cutting, and may even cause a breakage of the drill main body itself because of an excessive torque applied to the drill due to increased frictional resistance.

SUMMARY OF THE INVENTION

Based on the above, an object of the present invention is to provide a drill in which a sufficient strength of the cutting edge, specifically, at the periphery, is ensured, while degradation of the cutting ability all along the cutting edge is prevented, and which enables performance of smooth and stable drilling due to an excellent chip discharge performance.

In order to achieve the above object, a drill according to a first aspect of the present invention comprises: a drill comprising a drill main body rotatable about an axis of rotation, and having a tip end with a tip flank and a shank; a chip discharge flute formed on a periphery of the drill main body, and extending from the tip end toward the shank of the drill main body; and a cutting edge formed along an intersecting ridge where a wall surface of the chip discharge flute facing in the direction of drill rotation intersects the tip flank of the drill main body, wherein the cutting edge comprises a convex cutting edge toward the periphery and a concave cutting edge smoothly extending from the convex cutting edge.

In the drill according to the first aspect, because the cutting edge comprises the convex cutting edge, protruding in the direction of rotation, toward the periphery, the intersecting angle at the intersecting portion, i.e., the portion of the convex cutting edge at the periphery, where the convex cutting edge intersects the margin portion becomes large, whereby a sufficient strength of the cutting edge is ensured; thus, breakage or chipping of the drill can be prevented even under severe drilling conditions. In addition, because the cutting edge further comprises the concave cutting edge smoothly extending from the convex cutting edge toward the inner portion, a smooth curve is formed from the concave cutting edge to the periphery via the convex cutting edge, whereby the chips are not broken between the outer portion and the inner portion thereof, are sufficiently curled by the effect of the concave cutting edge, flow toward the inside, and can be smoothly discharged.

The radial rake angle of the cutting edge at the periphery is preferably set to have a negative value in order to further ensure the strength of the drill at the intersecting portion.

A drill according to a second aspect of the present invention comprises a drill main body rotatable about an axis of rotation, and having a tip end with a tip flank and a shank; a chip discharge flute formed on a periphery of the drill main body, and extending from the tip end toward the shank of the drill main body; and a cutting edge formed along an intersecting ridge where a wall surface of the chip discharge flute facing in the direction of drill rotation intersects the tip flank of the drill main body, wherein the chip discharge flute comprises a convex surface toward the periphery, a first concave surface smoothly extending from the convex surface, and a second concave surface formed on a wall surface of the chip discharge flute facing in the direction opposite to the direction of drill rotation, and wherein a connection surface is formed between the first concave surface and the second concave surface such that, when viewed in cross section perpendicular to the axis of rotation, the connection surface defines a tangent line being tangent to both of a concave line corresponding to the first concave surface and another concave line corresponding to the second concave surface, so as to smoothly connect the first concave surface and the second concave surface.

In the drill according to the second aspect, because the chip discharge flute comprises the convex surface, protruding in the direction of rotation, toward the periphery, the intersecting angle at the intersecting portion, i.e., the portion of the convex surface at the periphery, where the convex surface intersects the margin portion becomes large, whereby a sufficient strength of the drill can be ensured; thus, breakage or chipping of the drill can be prevented even under severe drilling conditions. In addition, because the chip discharge flute further comprises the first concave surface smoothly extending from the convex surface toward the inner portion, the entire chip including the outer portion flowing on the convex surface can be preferably curled and directed toward the inside while being guided along the first concave surface. Furthermore, because the chip discharge flute comprises the second concave surface formed on the wall surface of the chip discharge flute facing in the direction opposite to the direction of drill rotation, and a connection surface smoothly connected to both the first and the second concave surfaces is formed between the first and second concave surfaces, the chips are generally curled and can be smoothly discharged without being excessively abutted against the trailing wall surface of the chip discharge flute; consequently, the drill main body is subjected to less frictional resistance during drilling, which leads to less wear on the drill and less driving torque required for the drill rotation. In addition, forming the connection surface between the first and second concave surfaces makes it possible to have the chip discharge flute with a sufficient width without being restricted by the radiuses of curvature of the first and second concave surfaces, whereby the chips are preferably curled and discharged. Such a connection surface may be formed between the convex surface and the first concave surface, between the convex surface and the periphery, or between the second concave surface and the periphery.

A drill according to a third aspect of the present invention comprises: a drill main body rotatable about an axis of rotation, and having a tip end with a tip flank and a shank; a chip discharge flute formed on a periphery of the drill main body, and extending from the tip end toward the shank of the drill main body; and a cutting edge formed along an intersecting ridge where a wall surface of the chip discharge flute facing in the direction of drill rotation intersects the tip flank of the drill main body, wherein the chip discharge flute comprises a convex surface toward the periphery, a first concave surface smoothly extending from the convex surface, and a second concave surface which is formed on a wall surface of the chip discharge flute facing in the direction opposite to the direction of drill rotation and which smoothly extends from the first concave surface, and wherein, when viewed in cross section perpendicular to the axis of rotation, the radius of curvature of a concave line corresponding to the second concave surface is greater than that of a concave line corresponding to the first concave surface.

In the drill according to the third aspect, because the chip discharge flute comprises the convex surface, protruding in the direction of rotation, toward the periphery, the intersecting angle at the intersecting portion, i.e., the portion of the convex surface at the periphery, where the convex surface intersects the margin portion becomes large, whereby a sufficient strength of the drill can be ensured; thus, breakage or chipping of the drill can be prevented even under severe drilling conditions. In addition, because the chip discharge flute further comprises the first concave surface smoothly extending from the convex surface toward the inner portion, the entire chip including the outer portion flowing on the convex surface can be preferably curled and directed toward the inside while being guided along the first concave surface. Furthermore, because the chip discharge flute comprises the second concave surface which is formed on the wall surface of the chip discharge flute facing in the direction opposite to the direction of drill rotation, and which is smoothly extended from the first concave surfaces, and the radius of curvature of the second concave surface is greater than that of the first concave surface, the chips are generally curled and can be smoothly discharged without being excessively abutted against the trailing wall surface of the chip discharge flute; consequently, the drill main body is subjected to less frictional resistance during drilling, which leads to less wear on the drill and less driving torque required for the drill rotation. In this case, each of the radiuses of curvature of the first and second surface may be constant, i.e., when viewed in cross section perpendicular to the axis of rotation, the first concave surface exhibits a first arc and the second concave surface exhibits a second arc, with a different radius from that of the first arc, which is smoothly connected to the first arc at a single connection point. Alternatively, the radius of curvature may be gradually increased from the first concave surface to the second concave surface; for example, these concave surfaces may exhibit one of various curves such as an ellipse, a trochoid, a cycloid, an involute, etc.

In the drill according to the second or third aspect of the present invention, when the concave amount measured in the direction of rotation is too small, the chips may not be sufficiently curled by the wall; and when it is too large, the braking effect due to abutment of the chips may become too large and the chips may be broken, which leads to insufficient discharge of the chips and to increased driving torque for drilling. With regard to the second concave surface, depending on the width of the connection surface, when the concave amount measured in the direction of rotation is too small, the braking effect due to excessive abutment of the chips from the first concave surface may be exhibited; and when it is too large, the chips may not be sufficiently curled since the second concave surface may not contribute to curling. Based on these facts, when viewed in cross section perpendicular to the axis of rotation, the offset L1 between a first imaginary line, which is defined by connecting the axis of rotation and an outermost point of the wall surface of the chip discharge flute facing in the direction of drill rotation, and the bottom of the first concave surface is preferably set in a range from $-0.06 \times D$ to 0, and an offset L2 between a second imaginary line, which perpendicularly intersects the first imaginary line at the axis of rotation, and the bottom of the second concave surface is preferably set in a range from $-0.06 \times D$ to $0.06 \times D$, where D is the diameter of the drill main body.

The above-described second aspect and the third aspect may be combined. In other words, in the drill according to the second aspect, the radius of curvature of the second concave surface may be set to be greater than that of the first concave surface. In this case, the chips are sufficiently curled by the first concave surface with a relatively small radius of curvature, and then, are smoothly discharged via the second concave surface while excessive abutment against the second concave surface is prevented.

In the case in which the chip discharge flute comprises the convex surface, the first concave surface, and the second concave surface, smoothly connected to each other in this order, when viewed in cross section perpendicular to the axis of rotation, the radius of curvature of a convex line corresponding to the convex surface is preferably set in a range from $0.1 \times D$ to $0.8 \times D$, where D is the diameter of the drill main body. When the radius of curvature of the convex line is too large, the chips may not be sufficiently curled, and when it is too small, the strength of the convex cutting edge may not be sufficient at the intersecting portion where the convex cutting edge intersects the margin portion. With regard to the first concave surface, when viewed in cross section perpendicular to the axis of rotation, the radius of curvature of a concave line corresponding to the first concave surface is preferably set in a range from $0.18 \times D$ to $0.35 \times D$, where D is the diameter of the drill main body. When the radius of curvature of the concave line is too large, the chips may not be sufficiently curled by abutment, and when it is too small, the chips may be excessively curled, which may produce an excessive braking effect. With regard to the second concave surface, when viewed in cross section perpendicular to the axis of rotation, the radius of curvature of a concave line corresponding to the second concave surface is preferably set in a range from $0.2 \times D$ to $0.5 \times D$, where D is the diameter of the drill main body. When the radius of curvature of the concave line is too large, the chips may be curled only by abutment against the first concave surface without abutting against the second concave surface, and when it is too small, the chips may be excessively abutted against the second concave surface, which may produce an excessive braking effect.

A drill according to a fourth aspect of the present invention comprises: a drill main body rotatable about an axis of rotation, and having a tip end with a tip flank and a shank; a chip discharge flute formed on a periphery of the drill main body, and extending from the tip end toward the shank of the drill main body; a cutting edge formed along an intersecting ridge where a wall surface of the chip discharge flute facing in the direction of drill rotation intersects the tip flank of the drill main body; and a thinning portion extending from the end of the wall of the chip discharge flute to the inner portion the cutting edge, wherein the thinning portion comprises a first thinning portion in a recessed shape whose bottom portion is formed by a rounded concave surface and extends from the end of the wall of the chip discharge flute toward the inner end of the cutting edge.

In the drill according to the fourth aspect, because the thinning portion comprises the first thinning portion in a recessed shape whose bottom portion is formed by a rounded concave surface and extends from the end of the wall of the chip discharge flute toward the inner end of the cutting edge, the chips produced by a thinning cutting edge formed along an intersecting ridge where the thinning portion intersects the tip flank of the drill main body are smoothly curled by the rounded concave surface in the bottom of the first thinning portion, and are carried into the chip discharge flute without clogging.

The aperture angle of the first thinning portion, i.e., the angle defined by a pair of intersecting ridges formed by the first thinning portion and two tip flanks (one of the intersecting ridges where the first thinning portion intersects the tip flank adjacent to the chip discharge flute forms the thinning cutting edge) is preferably set in a range from 95° to 105°. When the aperture angle is too large, the chips produced by the thinning cutting edge and curled by the rounded bottom of the first thinning portion may not be smoothly carried into the chip discharge flute, and when it is too small, the chips produced by the thinning cutting edge may not be sufficiently curled before being carried into the chip discharge flute.

The radius of curvature of a concave curve defined, in cross section, by the bottom portion of the first thinning portion is preferably set in a range from 0.1 mm to 0.5 mm. When the radius of curvature is too small, the chips may be excessively abutted against the bottom of the first thinning portion, which may cause an excessive frictional resistance or rapid wear on the drill, and when it is too large, the chips produced by the thinning cutting edge may not be sufficiently curled.

In the drill according to the fourth aspect, the thinning portion may further comprise the second thinning portion extending from the inner end of the first thinning portion to the innermost point of the cutting edge. Because the bottom of the second thinning portion, when viewed in cross section along the bottom of the second thinning portion, further inclines than the bottom of the first thinning portion, the width of the chisel formed at the intersecting portion where the end of the bottom of the second thinning portion intersects the tip flank may be made small and also the tip angle measured along the bottom may be made large, even when the inclining angle of the bottom of the first thinning portion is relatively small.

When the second thinning portion is formed as a recess continuously extending from the bottom of the first thinning portion, the radius of curvature of the bottom of the second thinning portion, in cross section, is preferably set to be less than that of the bottom of the first thinning portion, and more specifically less than 0.1 mm. When the radius of curvature of the bottom of the second thinning portion is too large, the thrust force may not be sufficiently reduced due to a relatively large chisel width because the intersecting portion where the end of the bottom of the second thinning portion intersects the tip flank may not be closely positioned with respect to the center of the tip flank. The radius of curvature of the bottom of the second thinning portion may be set as zero, i.e., the second thinning portion may be a recess with a V-shaped cross section.

In order to ensure a sufficient rigidity of the drill main body while the thrust force is preferably reduced, the web thickness of the drill main body is preferably set in a range from 0.15×D to 0.3×D, where D is the diameter of the drill main body.

A drill according to a fifth aspect of the present invention comprises: a drill main body rotatable about an axis of rotation, and having a tip end with a tip flank and a shank; a chip discharge flute formed on a periphery of the drill main body, and extending from the tip end toward the shank of the drill main body; a cutting edge formed along an intersecting ridge where a wall surface of the chip discharge flute facing in the direction of drill rotation intersects the tip flank of the drill main body, wherein a rake angle of the cutting edge, when viewed in cross section perpendicular to the cutting edge, is gradually increased in accordance with the radius of rotation up to a transition point, and then the rake angle is gradually decreased to the periphery of the drill main body.

In the drill according to the fifth aspect, because the orthogonal rake angle of the cutting edge is gradually increased in accordance with the radius of rotation up to a transition point, an excellent cutting ability can be ensured and cutting resistance can be preferably reduced. On the other hand, because the rake angle is gradually decreased in accordance with the radius of rotation from the transition point to the periphery of the drill main body, the included angle becomes large, whereby a sufficient strength of the cutting edge is ensured, and chipping or breakage of the drill main body and rapid flank wear can be preferably prevented.

The radius of rotation of the transition point is preferably set in a range from 70% to 90% of the maximum radius of rotation. When the transition point is set at a point whose radius of rotation is less than 70% of the maximum radius of rotation, the cutting resistance may not be preferably restricted because the rake angle gradually decreases along a relatively long length of the cutting edge, and when the transition point is set at a point whose radius of rotation is greater than 90% of the maximum radius of rotation, a sufficient strength of the cutting edge may not be ensured near the periphery because the rake angle gradually decreases along a quite short length of the cutting edge.

When the cutting edge comprises a convex cutting edge, protruding in the direction of rotation, toward the periphery and a concave cutting edge smoothly extending from the convex cutting edge toward the inner portion, the intersecting angle at the intersecting portion, i.e., the portion of the convex cutting edge at the periphery, where the convex cutting edge intersects the margin portion becomes large, whereby a sufficient strength of the cutting edge is ensured; thus, breakage or chipping of the drill can be prevented even under severe drilling conditions; further, a smooth curve is formed from the concave cutting edge to the periphery via the convex cutting edge, whereby the chips are not broken between the outer portion and the inner portion thereof, are sufficiently curled by the effect of the concave cutting edge, flow toward the inside, and can be smoothly discharged, unlike the drill disclosed in Japanese Unexamined Patent Application, First Publication, No. 2000-198011 in which an outer corner cutting edge obliquely extends in the direction opposite to the direction of drill rotation from the end of the major cutting edge at a certain radius of rotation, whereby the chips are broken between the outer portion and the inner portion thereof. In addition, the transition point may be preferably positioned at the inflection point between the convex cutting edge and the concave cutting edge, whereby it is possible to disperse the stress generated in the cutting edge due to transition in the rake angle from a gradual increase to a gradual decrease, and to prevent breakage of the cutting edge due to a stress concentration at the transition point under severe cutting conditions such as high speed and dry cutting.

When the rake angle is set to gradually increase in accordance with the radius of rotation up to the transition point, and then to gradually decrease, the rake angle is preferably set in a range of y±7° at a point where the ratio of its radius of rotation to the maximum radius of rotation is in a range from 37.5% to 82.6%, where y is derived from the following equation:
y=−3.958x$^4$+39.987x$^3$−151.2x$^2$+267.22x−169.17 (equation 1), where x is the radius ratio; and the rake angle is preferably set in a range of y±7° at a point where the ratio is in a range from 82.6% to 100%, where y is derived from the following equation: y=−10.579x+68.733 (equation 2). When the rake angle of the cutting edge is set over the range of y±7°, where y is derived from the equation 1 or 2, the included angle of the cutting edge partly becomes too small, which may cause breakage of the cutting edge, specifically under high speed and dry cutting conditions. On the other hand, when the rake angle of the cutting edge is set below the range of y±7°, where y is derived from the equation 1 or 2, the cutting resistance is increased at that point, which may cause rapid wear of the cutting edge and an excessive driving torque for drilling.

In the drill according to all of above aspects, a hard coating such as TiN, TiCN, TiAlN, etc. may be preferably coated on the surface of at least the tip portion of the drill main body, whereby it is possible to improve a wear resistance of the tip portion of the drill main body.

DETAILED DESCRIPTION OF THE PREFERRED EMBODIMENTS

Figure 1:
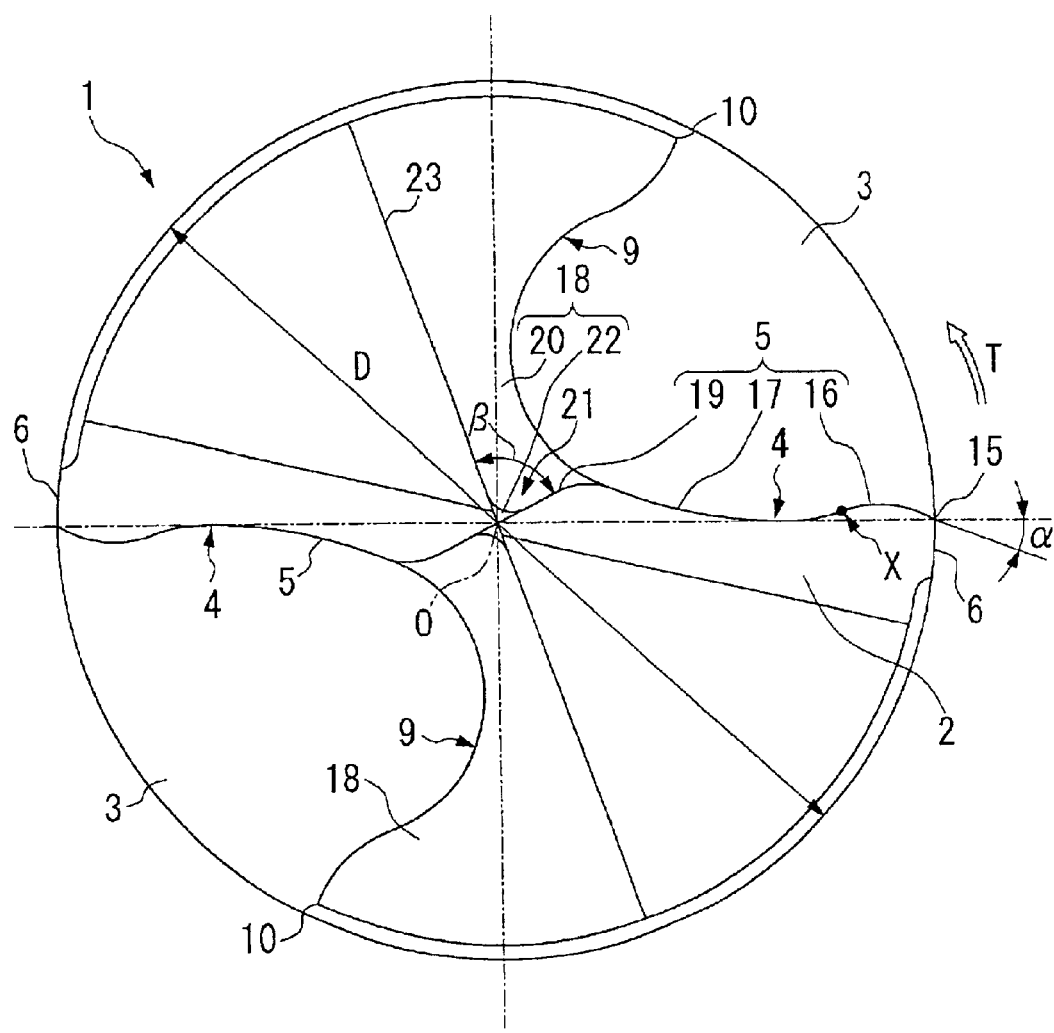
FIG. 1 is a front view showing a drill according to a first embodiment of the present invention when viewed in the axis of rotation.

The preferred embodiments of the present invention will be explained with reference to the accompanying drawings.

FIGS. 1 to 12 show the first embodiment of the present invention. In this embodiment, the drill main body 1 made of a hard material, such as cemented carbide, or the like, is substantially formed in a cylindrical shape with the axis of rotation O as a center, in which a pair of chip discharge flutes 3 are symmetrically formed with respect to the axis of rotation O from the tip flank 2 toward the shank of the drill main body 1 while being twisted at a constant twist ratio in the direction opposite to the direction of drill rotation during use. A pair of cutting edges 5 are formed along intersecting ridges where wall surfaces 4 of the chip discharge flutes 3 facing in the direction of rotation T intersects the tip flank 2. The periphery, the tip flank 2, and the chip discharge flute 3 on the drill main body for drilling are covered with a hard coating, such as TiN, TiCN, TiAl, or the like.

Figure 2:
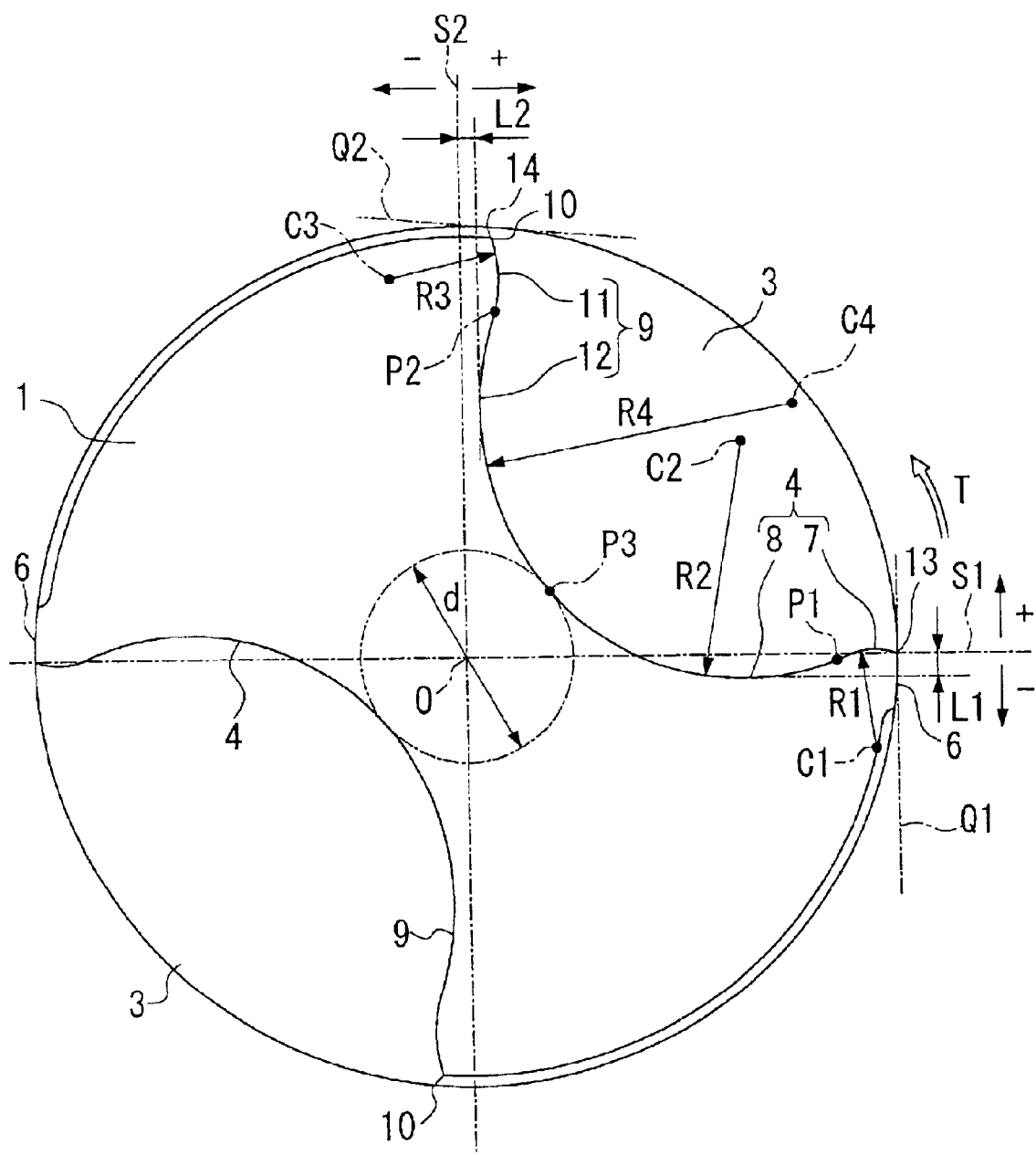
FIG. 2 is a cross-section of the drill shown in FIG. 1 taken along a plane perpendicular to the axis of rotation.

The wall surface 4 comprises a first convex surface 7 located near the periphery, intersecting with a margin portion 6, and seen as a convex line protruding in the direction of rotation when viewed in cross section perpendicular to the axis of rotation O as shown in FIG. 2, and a first concave surface 8 located inside the first convex surface 7 and seen as a concave line when viewed in the above-mentioned cross section. The convex line corresponding to the first convex surface 7 is smoothly connected to the concave line corresponding to the first concave surface 8 at a point of contact P1. In this embodiment, the wall surfaces 9 of the chip discharge flutes 3 facing in the direction opposite to the direction of drill rotation T comprises a second convex surface 11 located near the periphery, extending to a heel portion 10, and seen as a convex line protruding in the direction opposite to the direction of drill rotation T when viewed in the above-mentioned cross section, and a second concave surface 12 located inside the second convex surface 11 and seen as a concave line when viewed in the above-mentioned cross section. The convex line corresponding to the second convex surface 11 is smoothly connected to the concave line corresponding to the second concave surface 12 at a point of contact P2. In addition, the first concave surface 8 on the wall surface 4 and the second concave surface 12 on the wall surface 9 are also smoothly connected to each other, when viewed in the above-mentioned cross section, at a point of contact P3. The outer surface of a land extending in the direction opposite to the direction of drill rotation T from the margin portion 6 to the heel portion 10 is formed cylindrically having a step from the margin portion 6 toward the inside.

Furthermore, in this embodiment, the first convex and concave surfaces 7 and 8, and the second convex and concave surfaces 11 and 12 are formed so as to be seen as arcs in the above-mentioned cross section whose centers are respectively located at points C1 to C4, and whose radiuses are respectively set as radiuses R1 to R4. The center C1 of the arc corresponding to the first convex surface 7 is located toward the inside with respect to a line Q1 which is the tangent line at a peripheral point 13 in the margin portion 6, i.e., at the intersection of the first convex surface 7 and the margin portion 6. The center C3 of the arc corresponding to the second convex surface 11 is located toward the inside with respect to a line Q2 which is the tangent line at the intersection 14 of a circle defined by rotating the peripheral point 13 around the axis of rotation O and an extended line from the arc corresponding to the second convex surface 11. Consequently, the first convex surface 7 protrudes in the direction of rotation T from a first imaginary line S1 defined by connecting the axis of rotation O and the peripheral point 13 in the wall surface 4, and the tangent line to the first convex surface 7 passing the peripheral point 13 extends outwardly and obliquely with respect to the first imaginary line S1 in the direction opposite to the direction of drill rotation T and defines an obtuse angle with the line Q1 perpendicularly intersecting the first imaginary line S1. The second convex surface 11 protrudes in the direction opposite to the direction of drill rotation from a line defined by connecting the axis of rotation O and the intersection of the second convex surface 11 and the heel portion 10.

Because the arcs respectively corresponding to the first and second concave surfaces 8 and 12 are smoothly connected at a point of contact P3, the centers C2 and C4 of the arcs are located on a straight line extending from the axis of rotation O through the point of contact P3. In this embodiment, the point of contact P3 is located at the bottom of the chip discharge flute 3; therefore, the circle with its center at the axis of rotation O and passing through the point of contact P3 defines the web thickness circle of the drill main body 1. The diameter d, i.e., the web thickness d of the drill main body 1 is preferably set in a range from 0.15×D to 0.3×D, where D is the diameter of the circle defined by rotating the periphery point 15 of the cutting edge 5 around the axis of rotation O, i.e., the outer diameter of the cutting edge 5.

The point of contact P1 at which the convex line corresponding to the first convex surface 7 is connected to the concave line corresponding to the first concave surface 8 is preferably located outside the circle having its center at the axis of rotation O and whose diameter equals to ⅔ of the outer diameter D of the cutting edge 5, and more preferably, located outside the circle having its center at the axis of rotation O and whose diameter equals to ⅚ of the outer diameter D. When viewed in cross section perpendicular to the axis of rotation O, the amount of concavity of the first concave surface 8 is preferably set such that the offset L1 between the first imaginary line S1 and the bottom of the first concave surface 8 falls in a range from −0.06×D to 0, and the amount of concavity of the second concave surface 12 is preferably set such that the offset L2 between the second imaginary line S2 and the bottom of the second concave surface 12 falls in a range from −0.06×D to 0.06×D, where D is the outer diameter of the cutting edge 5. The offset L1 is defined, in cross section, as the distance between the first imaginary line S1 and the line which is parallel to the first imaginary line S1 and which contacts the concave line corresponding to the first concave surface 8, and the offset L1 is measured as a positive value in the direction of drill rotation T, as shown in FIG. 2. Similarly, the offset L2 is defined, in cross section, as the distance between the second imaginary line S2 and the line which is parallel to the second imaginary line S2 and which contacts the concave line corresponding to the second concave surface 8, and the offset L2 is measured as a positive value in the direction opposite to the direction of drill rotation T, as shown in FIG. 2. In this embodiment, the entirety of the first concave surface 8 will not be located in the area defined with respect to the imaginary line S2 in the direction of drill rotation T.

Furthermore, when viewed in the above-mentioned cross section, the radiuses of curvature R1 to R4 of the arcs corresponding to the first convex and concave surfaces 7 and 8, and second convex and concave surfaces 11 and 12, respectively, are preferably set such that the radius R1 of the first convex surface 7 falls in a range from 0.1×D to 0.8×D, where D is the outer diameter of the cutting edge 5, the radius R2 of the first concave surface 8 falls in a range from 0.18×D to 0.35×D, the radius R3 of the second convex surface 11 falls in a range from 0.1×D to 0.8×D, and the radius R4 of the second concave surface 12 falls in a range from 0.2×D to 0.5×D. Specifically, in this embodiment, the radius R4 of the second concave surface 12 is set to be greater than the radius R2 of the first concave surface 8. In this embodiment, the ratio of the depth of the chip discharge flute to the width thereof is preferably set to be 0.8–1.2:1.

The cutting edge 5 is formed along the intersecting ridge where the wall surface 4 of the chip discharge flute 3 intersects the tip flank 2, and the wall surface 4 comprises the first convex and concave surfaces 7 and 8. The cutting edge 5 comprises, in the portion near the peripheral point 15, the convex cutting edge 16 protruding in the direction of drill rotation T, from which the first convex surface extends toward the shank, and the concave cutting edge 17 having concave shape and located inside the convex cutting edge 16, from which the first concave surface 8 extends toward the shank, as shown in FIG. 1; and thus, the cutting edge 5 exhibits a slightly curved S-shape including the convex cutting edge 16 and the concave cutting edge 17, when viewed from the axis of rotation O. Because the cutting edge 5 has an included angle defined by the inclination of the tip flank 2 toward the shank of the drill main body 1 in accordance with the radius of rotation from inside to the periphery, and because the chip discharge flutes are formed in a spiral shape, the shape of the combined S-shaped curve presented by the convex and concave cutting edges 16 and 17, when viewed from the axis of rotation O, is defined by shifting each point on the combined curve corresponding to the first convex and concave surfaces 7 and 8 of the wall surface 4, when viewed in cross section perpendicular to the axis of rotation O, in the direction of drill rotation T by the distance gradually increasing as the radius of rotation decreases. The tangent line to the convex cutting edge 16 at the peripheral point 15, when viewed from the axis of rotation O, extends outwardly and more obliquely in the direction opposite to the direction of drill rotation T, than in the case of the tangent line to the convex line corresponding to the first convex surface at the peripheral point 13, when viewed in the above-mentioned cross section; and thus, the radial rake angle a of the cutting edge 5 at the peripheral point 15 is set to be a negative value.

A thinning portion 18 is formed in the area where the wall surfaces 4 and 9 of the chip discharge flute 3 merge with the tip of the drill by cutting out material near the intersecting ridge where the first concave surface 8, the second concave surface 12, and the second convex surface 11 intersect the tip flank, such that the cut surface inclines and faces inside the chip discharge flute 3, and the thinning portion 18 extends to the heel portion 10. The inner portion of the cutting edge 5 is a thinning cutting edge 19 which is formed along the intersecting ridge where the thinning portion 18 intersects the tip flank 2, and which extends from the inner end of the concave cutting edge 17 toward the axis of rotation, i.e., the center of the tip flank 2. In the cutting edge 5, the thinning cutting edge 19 is smoothly connected to the concave cutting edge 17 via a convex curve or straight lines protruding in the direction of drill rotation T, when viewed from the axis of rotation O.

Figure 3:
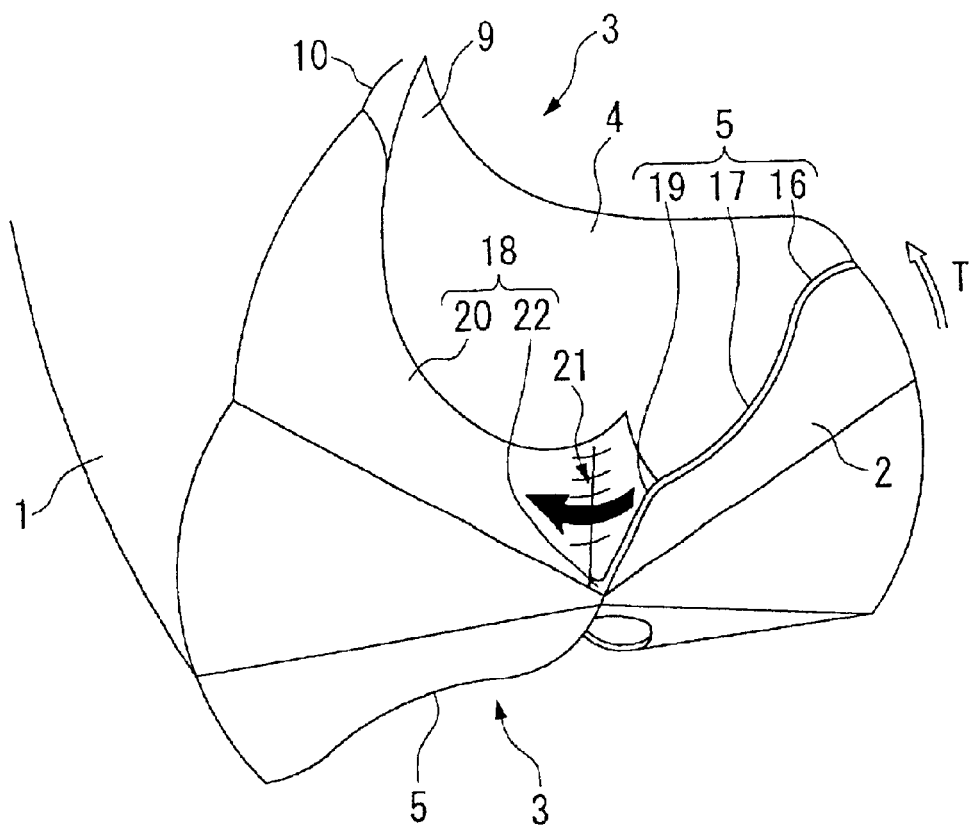
FIG. 3 is a perspective view of the tip portion of the drill shown in FIG. 1, specifically showing a thinning portion thereof.

The thinning portion 18 includes a first thinning portion 20 which is defined by a surface intersecting the wall surfaces 4 and 9 of the chip discharge flute 3. The first thinning portion 20 comprises a plane portion which intersects the wall surface 9 of the chip discharge flute 3 facing in the direction opposite to the direction of drill rotation T, and which extends toward the heel portion 10, and a concave portion with a rounded bottom 21, as shown in FIG. 3 which is located near the boundary between the wall surface 9 and the wall surface 4 facing in the direction of drill rotation T, and which extends from the point of contact P3 between the first and second concave surfaces 8 and 12 toward the center of the tip flank 2. The rounded bottom 21 extends from the wall surfaces 4 and 9 toward the inner end of the cutting edge 5, i.e., the inner end of the thinning cutting edge 19, while inclining toward the center of the drill main body 1. The radius of curvature, in cross section, of the rounded bottom 21 of the first thinning portion is preferably set in a range from 0.1 mm to 0.5 mm. This radius of curvature may be set to change so as to gradually increase as positioned toward the shank of the drill main body 1.

The aperture angle β of the first thinning portion 20, i.e., the angle defined by the intersecting ridge 23 where the first thinning portion 20 intersects the tip flank adjacent to the wall surface 9 facing in the direction opposite to the direction of drill rotation T, and the other intersecting ridge, i.e., the thinning cutting edge 19, where the first thinning portion 20 intersects the tip flank 2 adjacent to the wall surface 4 facing in the direction of drill rotation T, when viewed from the axis of rotation, is preferably set in a range from 95° to 105°.

In addition, a second thinning portion 22 having a recessed shape and being much shorter than the first thinning portion 20 is formed between the inner end of the first thinning portion and the very center of the tip portion of the drill main body 1. The bottom of the second thinning portion 22 extends from the rounded bottom 21 of the first thinning portion 20 to the inner end of the cutting edge 5, while inclining differently than in the case of the rounded bottom 21. The inner end of the cutting edge 5 is formed along the intersecting ridge where the second thinning portion 22 intersects the tip flank 2. The radius of curvature of the bottom of the second thinning portion 22 is preferably set to be less than that of the rounded bottom 21 of the first thinning portion 20, and specifically, less than 0.1 mm. The radius of curvature may even be zero, i.e., the bottom of the second thinning portion 22 may be of a V-shape. The radius of curvature may be set to change so as to gradually increase as positioned toward the shank of the drill main body 1, as similar to that of the rounded bottom 21 of the first thinning portion 20. By forming the inner end of the cutting edge 5 along the intersecting ridge where the second thinning portion 22, which inclines more than the first thinning portion 20, intersects the tip flank 2, the width of the chisel defined between a pair of the cutting edges 5 at the center of the tip flank 2 becomes shorter than in the case in which the inner end of the cutting edge 5 is formed by intersecting the first thinning portion 20 with the tip flank 2. In this embodiment, the width of the chisel is set in a range from 0 to 0.2 mm, which means that the ends of a pair of cutting edges 5 may coincide with each other at the axis of rotation O.

The operation of the drill having the construction described above will be explained below from a primary aspect. Because the cutting edge 5 comprises the convex cutting edge 16, protruding in the direction of drill rotation T, toward the peripheral point 15, the intersecting angle, when viewed from the axis of rotation O, at the peripheral point 15 where the convex cutting edge 16 intersects the margin portion 6 becomes large, and is greater than the intersecting angle of the first convex surface and the margin portion 6, whereby a sufficient strength of the drill main body 1 at the peripheral point 15 is ensured. Therefore, breakage or chipping of the cutting edge 5 can be prevented at the peripheral point 15 where an excessive stress tends to be generated since it rotates at the highest speed in the drill and the greatest amount of chips are produced; thus, a longer drill life can be ensured even under severe drilling conditions. In addition, in this embodiment, a sufficient strength of the drill main body 1 at the peripheral point 15 is further ensured because the convex cutting edge 16 protrudes in the direction of drill rotation T from the line defined by connecting the peripheral point 15 of the cutting edge 5 and the axis of rotation O, when viewed from the axis of rotation O, the radial rake angle α of the cutting edge 5 at the peripheral point 15 is set to be a negative value, and consequently, the intersecting angle at the peripheral point 15 where the convex cutting edge 16 intersects the margin portion 6 is set to be an obtuse angle.

Furthermore, because the convex cutting edge 16 is formed with a convex curve protruding in the direction of rotation, unlike a V-shaped folded line in the prior art, and because the concave cutting edge 17 smoothly extends from the convex cutting edge 16 toward the inner portion, the chips are not broken between the outer portion and the inner portion of the cutting edge 5, in contrast to the prior art in which the chips are broken by the V-shaped cutting edge. The chips produced by the concave cutting edge 17 are smoothly curled when they flow toward the inside. According to the invention, it is possible to smoothly discharge the chips without clogging of the chip discharge flute 3 by the broken and twined chips, to prevent rapid wear of the drill main body 1 due to the chips flowing outside the periphery, to reduce the driving torque for drilling, and to extend the drill life by reducing wear of the drill. The hard coating, such as TiN, TiCN, TiAl, or the like, on the tip portion of the drill main body including the cutting edge may further contribute to preferably extend the drill life.

The intersecting angle of the wall surface 4 of the chip discharge flute 3 and the margin portion 6 may be set to be large by forming the first convex surface 7 on the wall surface 4 toward the peripheral point 13, whereby a sufficient strength of the drill main body 1 at the peripheral point 13 can be ensured, and a sufficient drill life is ensured without having breakage or chipping at the peripheral point 13 under severe drilling conditions, such as during high speed and dry drilling. In addition, because the first concave surface 8 smoothly extends from the first convex surface 7 toward the inside, the entire chip including the outer portion flowing on the first convex surface 7 can be preferably curled and directed toward the inside while being guided along the first concave surface 8, even when the chips produced by the first convex surface 7 try to move out.

Furthermore, in the drill according to this embodiment, because the chip discharge flute 3 further comprises the second concave surface 12 which is formed on the wall surface 9 of the chip discharge flute 3 facing in the direction opposite to the direction of drill rotation T, and which is smoothly extended from the first concave surface 8, and the radius of curvature R4 of the second concave surface 12 is set to be greater than the radius of curvature R2 of the first concave surface 8, the chips are generally curled by the first concave surface 8 and can be smoothly discharged without being excessively abutted against the second concave surface 12 and being broken. Because the chips will not be excessively abutted against the second concave surface 12, rapid wear of the wall 9 of the chip discharge flute 3 due to abutment and an increase in driving torque can be preferably prevented. In this embodiment, because the second convex surface 11 smoothly extends from the second convex surface 12 toward the periphery, the heel portion 10 will not inhibit the flow of chips; thus, a sufficient strength of the drill main body 1 at the heel portion 10 can be preferably ensured.

In this embodiment, the concave lines respectively corresponding to the first and second concave surfaces 8 and 12 are defined by arcs, when viewed in cross section perpendicular to the axis of rotation, whose radiuses of curvature respectively set to be R2 and R4 (R2<R4), and these arcs are smoothly connected to each other at a point of contact P3 through which the co-tangent line extends, so as to form a continuous concave curve. When the chips are sufficiently curled to be compact by the first concave surface 8, the chips smoothly flow from the first concave surface 8 to the second concave surface 12 and are smoothly discharged. On the other hand, even when the chips are not sufficiently curled to be compact by the first concave surface 8, depending on the material of the workpiece, the chips may be curled to a suitable size by being moderately abutted against the second concave surface 12. Furthermore, by continuously forming the first and second concave surfaces 8 and 12, the width of the chip discharge flute 3 may be set not to be too wide, in other words, the cross-section area of the drill main body 1 can be sufficiently ensured; and thus, a sufficient rigidity of the drill main body 1 may be ensured. In this case, each of the radiuses of curvature R2 and R4 of the concave lines respectively corresponding to the first and second surfaces 8 and 12 is constant, and the concave lines are smoothly connected to each other at the point of contact P3; however, alternatively, the radius of curvature may be gradually increased from the first concave surface 8 to the second concave surface 12; for example, these concave surfaces may exhibit one of various curves such as an ellipse, a trochoid, a cycloid, an involute, or combination thereof In this embodiment, with regard to the first concave surface 8, the offset L1 between the first imaginary line S1, which is defined by connecting the axis of rotation O and the peripheral point 13 of the wall surface 4 of the chip discharge flute 3, and the bottom of the first concave surface 8 is preferably set in a range from −0.06×D to 0 (the offset L1 is measured as a positive value in the direction of drill rotation T), and with regard to the second concave surface 12, the offset L2 between the second imaginary line S2, which perpendicularly intersects the first imaginary line S1 at the axis of rotation O, and the bottom of the second concave surface 12 is preferably set in a range from −0.06×D to 0.06×D (the offset L2 is measured as a positive value in the direction opposite to the direction of drill rotation T), where D is the outer diameter of the cutting edge 5, whereby an appropriate braking effect may be applied to the chips by moderately abutting the chips against the first and second concave surfaces 8 and 12. Therefore, the chips may be sufficiently curled and discharged while preventing clogging of the chips and an increase in driving torque due to an excessive braking effect. In order to ensure such advantageous effects, the radius R2 of the concave line corresponding to the first concave surface 8 is preferably set in a range from 0.18×D to 0.35×D, and the radius R4 of the concave line corresponding to the second concave surface 12 is preferably set in a range from 0.2×D to 0.5×D, when viewed in cross section perpendicular to the axis of rotation O, where D is the outer diameter of the cutting edge 5.

Furthermore, in this embodiment, the radiuses R1 and R3 of the convex lines respectively corresponding to the first and second convex surfaces 7 and 11 are preferably set in a range from 0.1×D to 0.8×D, when viewed in cross section perpendicular to the axis of rotation O, where D is the outer diameter of the cutting edge 5, whereby a sufficient chip discharge performance may be ensured by preventing the width of the first and second concave surface 8 and 12 in the radial direction from being too narrow, while a sufficient strength of the drill main body 1 near the margin portion 6 and near the heel portion 10 is also ensured. In order to ensure these advantageous effects even under drilling conditions, such as during a high speed and dry drilling, the point of contact P1 at which the convex line corresponding to the first convex surface 7 is connected to the concave line corresponding to the first concave surface 8 is preferably located outside the circle having its center at the axis of rotation O and whose diameter equals to ⅔ of the outer diameter D of the cutting edge, and more preferably, is located outside the circle having its center at the axis of rotation O and whose diameter equals to ⅚ of the outer diameter D, and in addition, the ratio of the depth of the chip discharge flute 3 to the width thereof is preferably set to be 0.8–1.2:1.

In this embodiment, because the driving torque for drilling is preferably reduced by the improvement in chip discharge performance, the stress applied to the drill main body 1 during drilling is also reduced; therefore, the web thickness d of the drill main body 1 may be set to be a relatively small value, i.e., preferably set in a range from 0.15×D to 0.3×D, where D is the outer diameter of the cutting edge. As a result, it is possible to specifically reduce the thrust force among the forces applied to the drill main body 1, and to increase the cross-section area of the chip discharge flute 3, whereby chip discharge performance may be further improved, and the power required for drilling operation may be further decreased. The cross-section area of the drill main body 1 is sufficiently ensured by setting the radiuses of curvature R1 to R4 in the appropriate range, and by forming the first and second convex surfaces 7 and 11 which increase the cross-section area near the periphery; and thus, a sufficient rigidity of the drill main body 1 may be ensured. Having a reduced power required for drilling and a sufficient rigidity of the drill main body 1, it is possible to prevent breakage of the drill, which will cause a shortened drill life.

In this embodiment, because the thinning portion 18 is formed in the area where the wall surfaces 4 and 9 of the chip discharge flute 3 merge with the tip of the drill, the inner portion of the cutting edge 5 comprises the thinning cutting edge 19, and because the first thinning portion 20 in the shape of recess with the rounded bottom 21 extends from the thinning cutting edge 19, the inner portion of the chip produced by the thinning cutting edge 19 is curled along the concave line, in cross section, corresponding to the bottom 21 of the first thinning portion 20, and carried toward the inside, as shown by the bold arrow in FIG. 3. Therefore, it is possible to smoothly carry into the chip discharge flute 3 and discharge the chips produced by the thinning cutting edge 19 together with the chips produced by the concave and convex cutting edges 17 and 16 located outside the thinning cutting edge 19, without clogging or fusion of the chips in the thinning portion 18, even under drilling conditions, such as during a high speed and dry drilling. The above-mentioned effect achieved by the thinning cutting edge 19 and the thinning portion 18 is important, specifically for drilling a workpiece made of difficult-to-machine material.

In this embodiment, because the thinning portion 18 further comprises, at its tip portion, the second thinning portion 22 extending with more inclining angle than that of the bottom 21 of the first thinning portion 20, the inner end of the cutting edge 5 is formed along the intersecting ridge where the second thinning portion 22 intersects the tip flank 2, and because the radius of curvature of the bottom of the second thinning portion 22 is set to be less than that of the rounded bottom 21 of the first thinning portion 20, and specifically, less than 0.1 mm, the inner end of the cutting edge 5 is positioned very close to the intersection of the tip flank 2 and the axis of rotation O; therefore, the width of the chisel becomes very small, i.e., in a range from 0 to 0.2 mm. As a result, the bite performance of the drill on a workpiece may be preferably improved, the drill preferably advances straight, a stable and accurate drilling is achieved, the thrust force applied to the drill main body 1 in the direction of axis of rotation O may be reduced, and the power required for drilling may be reduced. Because two thinning portions, i.e., the first and second thinning portions 20 and 22 are formed while the bottom of the second thinning portion further inclining than the bottom of the first thinning portion, the included angle of the drill main body 1, when viewed in cross section along the bottom of the second thinning portion 22, becomes greater than in the case in which a single thinning portion is used to form the same width of the chisel; therefore, a sufficient strength of the drill main body 1, specifically at the tip, may be preferably ensured; in other words, for example, it is possible to prevent breakage of the tip of the drill main body 1, which shortens the drill life, when an impulsive force is applied thereto. When it is possible to ensure sufficient bite performance, strength, and straight advancement of the drill main body 1, the second thinning portion 22 may be omitted.

In this embodiment, the radius of curvature of the concave curve defined, in cross section, by the bottom portion 21 of the first thinning portion 20 is preferably set in a range from 0.1 mm to 0.5 mm, because, when the radius of curvature is set above this range, the chips produced by the thinning cutting edge may not be sufficiently curled, and when the radius of curvature is set below this range, the chips may be clogged in the thinning portion 18. When the radius of curvature of the bottom of the second thinning portion 22 is set to be greater than that of the bottom portion 21 of the first thinning portion 20, or greater than 0.1 mm, the thrust force may not be sufficiently reduced. When the width of the chisel is to large, the thrust force may not be sufficiently reduced. The aperture angle of the first thinning portion, i.e., the angle defined by a pair of intersecting ridges formed by the first thinning portion and two tip flanks (one of the intersecting ridges where the first thinning portion intersects the tip flank adjacent to the chip discharge flute forms the thinning cutting edge) is preferably set in a range from 95° to 105°. When the aperture angle β of the first thinning portion 20 is set to be greater than 105°, the chips produced by the thinning cutting edge 19 and curled by the rounded bottom portion 21 of the first thinning portion 20 may be carried outward along the first thinning portion 20, and may not be smoothly carried into the chip discharge flute 3, and when the aperture angle β is set to be less than 95°, the chips produced by the thinning cutting edge 19 may not be sufficiently curled before being carried into the chip discharge flute 3.

Unlike in the drill disclosed in Japanese Unexamined Patent Application, First Publication, No. 2000-198011 or Japanese Examined Patent Application, Second Publication, No. Hei 4-46690, in which the cutting edge is formed with a V-shaped folded portion, the convex cutting edge 16 in the present invention exhibits a smooth curve, and the same applies to the boundary between the thinning cutting edge 19 and the concave cutting edge 17; therefore, the chips are produced continuously all along the cutting edge 5. Because the concave cutting edge 17 smoothly extends from the convex cutting edge 16 toward the inside, and the first concave surface 12 in the wall surface 4 of the chip discharge flute 3 extends from the concave cutting edge 17 toward the shank of the drill main body 1, the chip continuously produced all along the cutting edge 5 tends to be carried to the inside and is generally curled by being abutted against the first concave surface 8 since the portion in the chip produced by the concave cutting edge 17 is carried to the inside, and the portion in the chip produced by the convex cutting edge 16 tends to be pulled toward the inside. In addition, the portion in the chip produced by the thinning cutting edge 19 located inside the concave cutting edge 17 is curled by being abutted against the bottom portion 21 of the first thinning portion 20; therefore, the entirety of the chip is carried to the inside, is smoothly curled, is carried into the chip discharge flute 3, and is discharged. As a result, in this embodiment, it is possible to smoothly discharge the chips without clogging of the chip discharge flute 3 by the broken and twined chips, as in the case of the prior art, to prevent rapid wear of the drill main body 1 due to the chips flowing outside the periphery, to reduce the driving torque for drilling, and to extend the drill life by reducing wear of the drill.

In this embodiment, because the web thickness d of the drill main body 1 may be set to be a relatively small value, as described before, and furthermore, the width of the chisel becomes very small due to the second thinning portion 22 in the thinning portion 18, it is possible to specifically reduce the thrust force among the forces applied to the drill main body 1, and to increase the cross-section area of the chip discharge flute 3, whereby chip discharge performance may be further improved, and the power required for drilling operation may be further decreased.

The following Table 1 shows drilling test results in which the drills according to the present invention and comparison drills 1 to 5 in which the radius of curvature R1 of the convex surface 7, the sizes of the first and second concave surfaces 8 and 12, and the web thickness d are different from, and the other specifications are similar to, that of the present invention were compared under high speed and dry conditions at different cutting speeds. The drilling conditions are as follows:

Drill diameter: 8 mm;
Material of workpiece: S50C (0.50% Carbon steel);
Cutting speed: vc=80, 150, 200 m/min.;

Feed rate: fr=0.2 mm/rev.;
Hole depth: L/D=3; and
Dry condition with air supply.

TABLE 1

|  |  | R (% × diameter D) | | | | Web thickness | Drill wear at drilling | Shape of | Thrust | Horizontal force | General |
| --- | --- | --- | --- | --- | --- | --- | --- | --- | --- | --- | --- |
|  |  | R1 | R2 | R3 | R4 | (% × diameter D) | length of 30 m | chips | force | component | appraisal |
| Comparison drills | 1 | 8 | 27 | 13 | 35 | 25 | Δ: Shoulder chipping | ○ | ○ | ○ | Δ |
|  | 2 | 85 | 27 | 13 | 35 | 25 | Δ: Significant wear | Δ | Δ | Δ | Δ |
|  | 3 | 13 | 35 | 13 | 27 | 25 | Δ: Significant wear | Δ | Δ | Δ | Δ |
|  | 4 | 13 | 27 | 13 | 35 | 35 | Δ: Significant wear | Δ | Δ | Δ | Δ |
|  | 5 | 13 | 27 | 13 | 35 | 13 | X: Body Breakage | Δ | ○ | X | X |
| Drills of the Invention | 1 | 13 | 27 | 13 | 35 | 25 | ◎: Normal wear | ◎ | ○ | ◎ | ◎ |
|  | 2 | 13 | 27 | 13 | 35 | 23 | ◎: Normal wear | ◎ | ◎ | ◎ | ◎ |
|  | 3 | 13 | 25 | 13 | 31 | 20 | ◎: Normal wear | ◎ | ◎ | ○ | ○ |

In Table 1,
"◎" means "Very good", "○" means "Good",
"Δ" means "Undersirable", and "X" means "Bad".

As shown in Table 1, the comparison drill 1, in which the radius of curvature R1 of the first convex surface 7 was set to be less than 0.1×D, where D is the outer diameter of the cutting edge 5, exhibited chipping at the shoulder, i.e., at the peripheral point 15, of the convex cutting edge because the width of the convex cutting edge 16 became narrow as the width of the first convex surface 7 was set to be narrow. The comparison drill 2, in which, the radius R1 was set to be greater than 0.8×D in contrast to the comparison drill 1, exhibited an excessive wear because the convex surface 7 and the convex cutting edge 16 were wide, the concave surface 8 and the concave cutting edge 17 comparatively became narrow, the chip curling performance was degraded, and the chips were abutted against the wall surfaces 4 and 9 of the chip discharge flute 3. In the comparison drill 3, in which the radius R2 of the first concave surface 8 was set to be greater than the radius R4 of the second concave surface 12 in contrast to the present invention, the chips exhibited the shape with a small radius as shown in FIG. 4B because the chips were excessively abutted against the second concave surface 12, and the second concave surface exhibited an excessive wear. Furthermore, the comparison drill 4, in which the web thickness d was set to be greater than 0.3×D, exhibited an excessive wear because the cross-section area of the chip discharge flute 3 became small and the chips were excessively abutted against the wall, and also, it required more driving torque for drilling due to the increased thrust force. The comparison drill 5, in which the web thickness d was set to be less than 0.15×D, was broken due to less rigidity, although the thrust force was reduced.

Figure 4A:
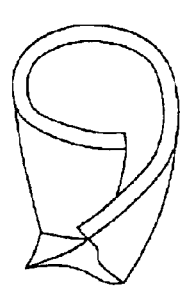
FIG. 4A is a perspective view showing a chip produced by the drill shown in FIG. 1.
Figure 4B:
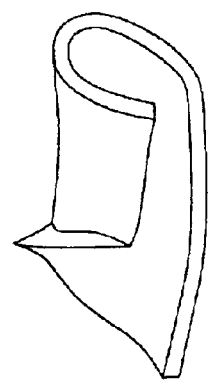
FIG. 4B is a perspective view showing a chip produced by a comparison drill 3 described below in which the radius of curvature R2 of the first concave surface is greater than the radius of curvature R4 of the second concave surface, unlike in the drill shown in FIG. 1.
Figure 5:
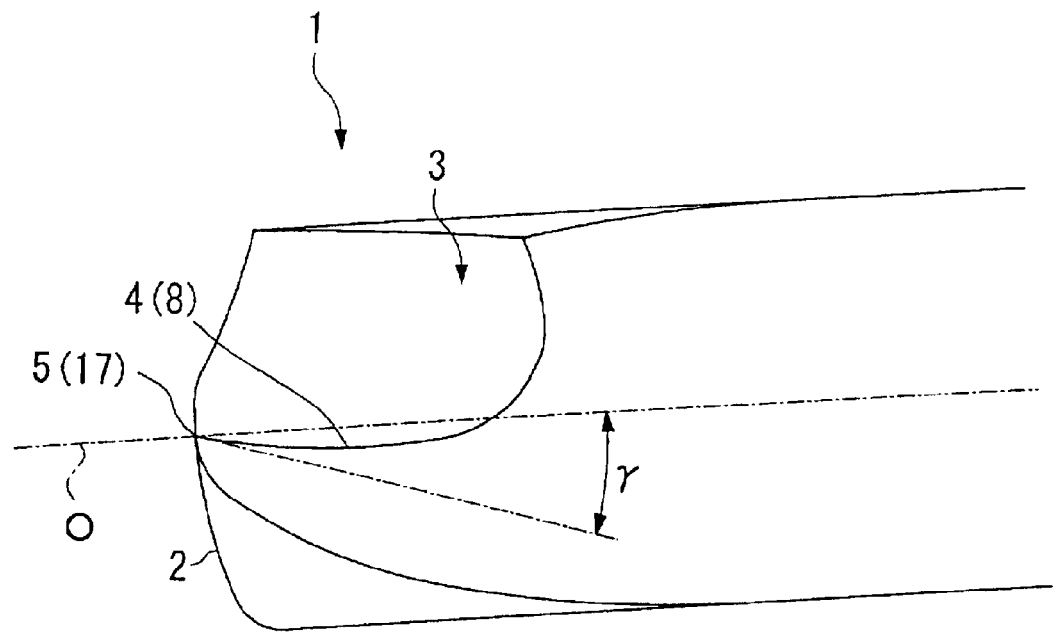
FIG. 5 is a cross-section of the drill shown in FIG. 1 taken along a plane which is perpendicular to the cutting edge, and which is positioned at a point on the cutting edge where the distance from the axis of rotation is 0.500×r (x=0.500) with respect to the maximum radius of rotation r.
Figure 6:
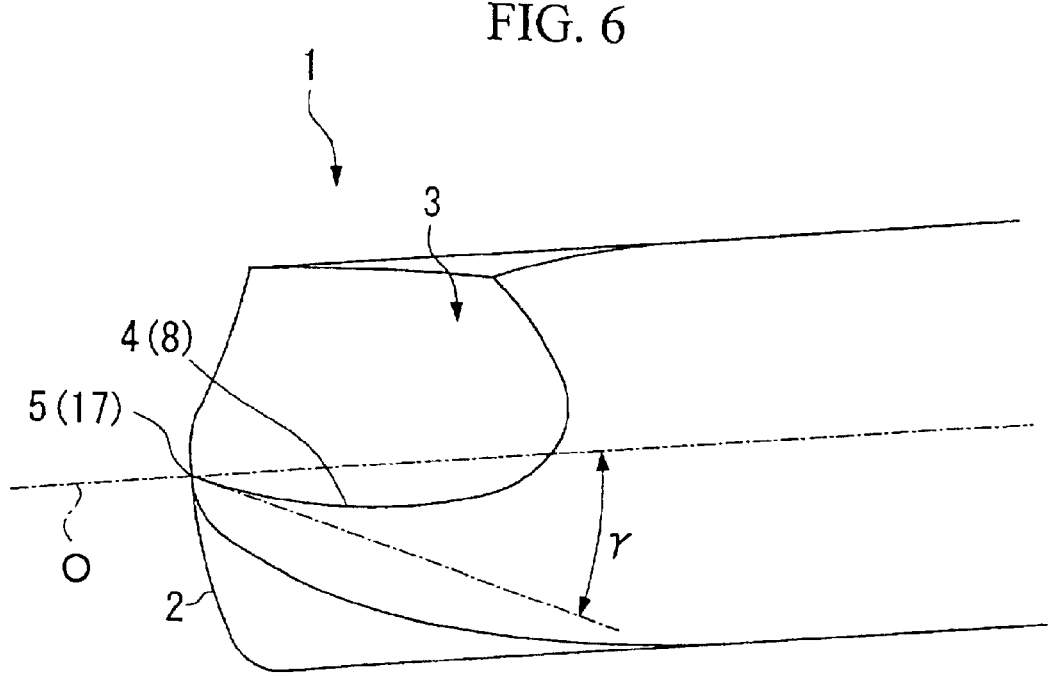
FIG. 6 is a cross-section of the drill shown in FIG. 1 taken along a plane which is perpendicular to the cutting edge, and which is positioned at a point on the cutting edge where the distance from the axis of rotation is 0.625×r (x=0.625) with respect to the maximum radius of rotation r.
Figure 7:
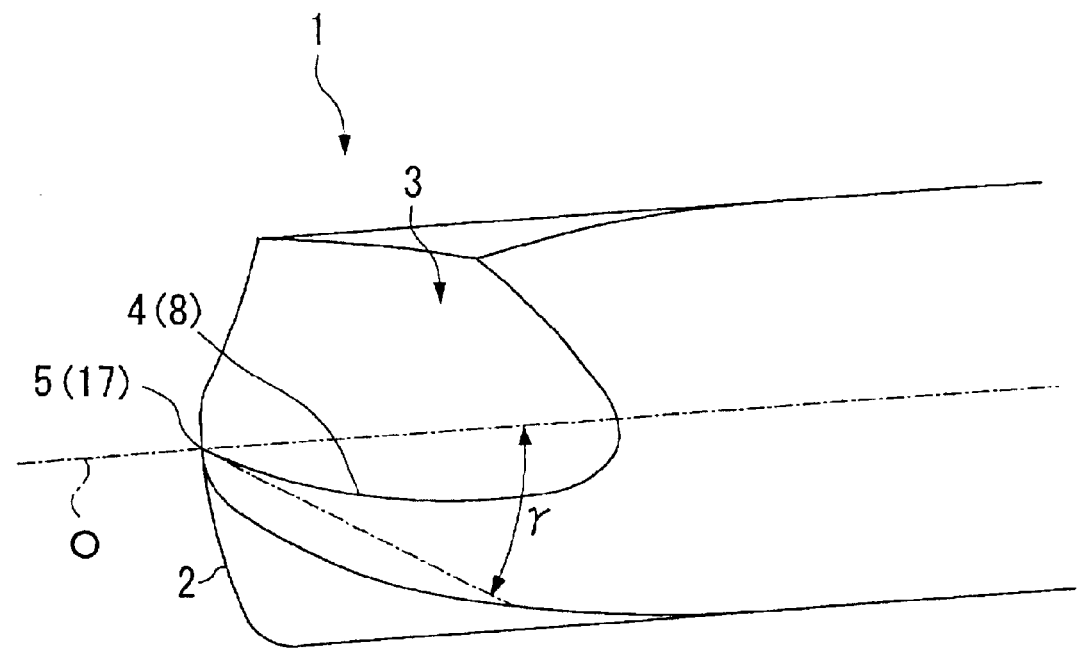
FIG. 7 is a cross-section of the drill shown in FIG. 1 taken along a plane which is perpendicular to the cutting edge, and which is positioned at a point on the cutting edge where the distance from the axis of rotation is 0.750×r (x=0.750) with respect to the maximum radius of rotation r.
Figure 8:
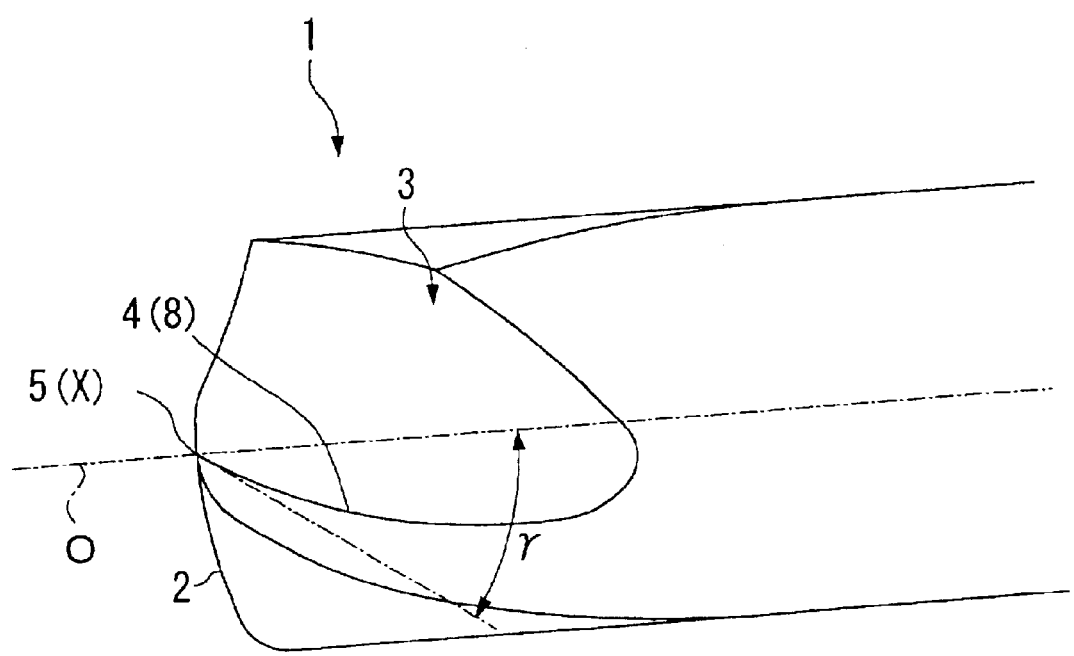
FIG. 8 is a cross-section of the drill shown in FIG. 1 taken along a plane which is perpendicular to the cutting edge, and which is positioned at a point on the cutting edge where the distance from the axis of rotation is 0.826×r (x=0.826) with respect to the maximum radius of rotation r.
Figure 9:
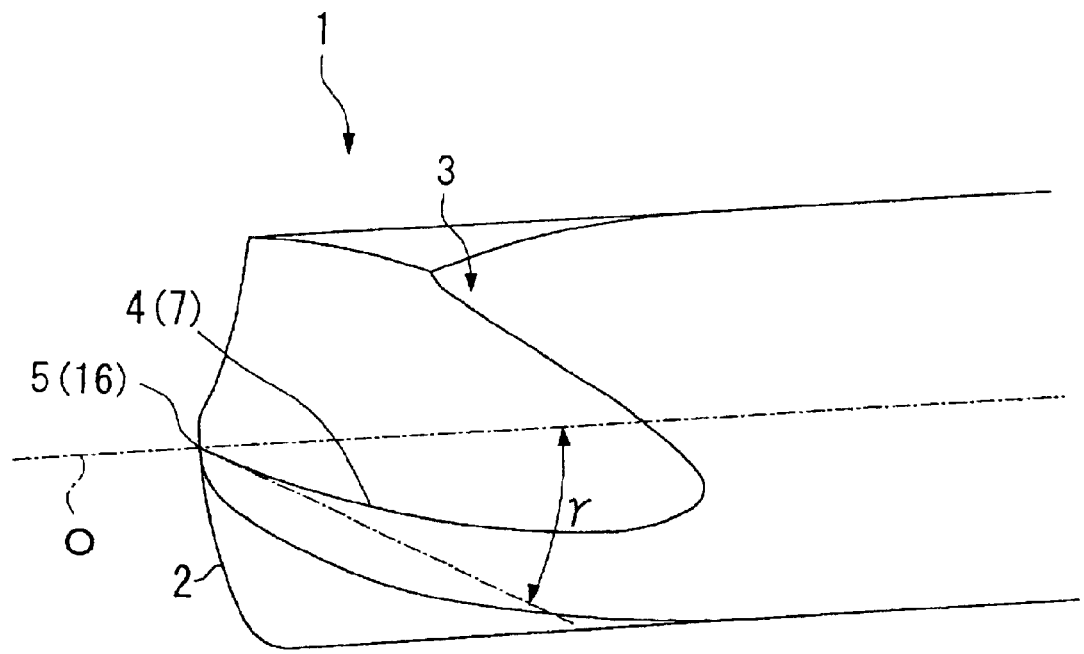
FIG. 9 is a cross-section of the drill shown in FIG. 1 taken along a plane which is perpendicular to the cutting edge, and which is positioned at a point on the cutting edge where the distance from the axis of rotation is 0.925×r (x=0.925) with respect to the maximum radius of rotation r.
Figure 10:
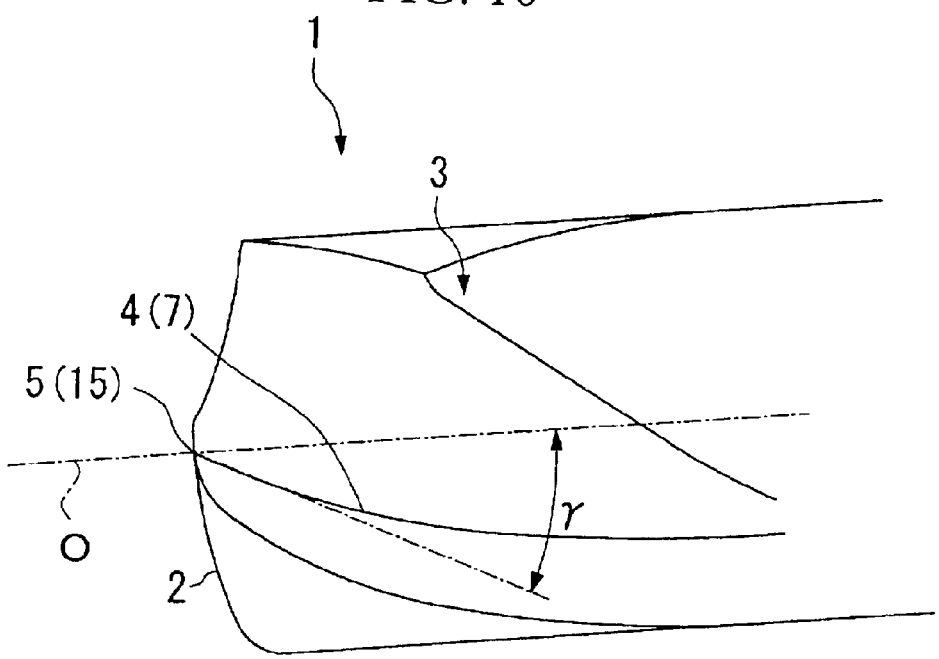
FIG. 10 is a cross-section of the drill shown in FIG. 1 taken along a plane which is perpendicular to the cutting edge, and which is positioned at the periphery where the distance from the axis of rotation is 1.000×r (x=1.000) with respect to the maximum radius of rotation r.

In contrast to the comparison drills 1 to 5, in the drills according to the present invention, the discharged chips were sufficiently curled in shapes with an appropriate radius as shown in FIG. 4A, and the wear of the wall surfaces 4 and 9 of the chip discharge flute 3 was moderate. Specifically, the drill 2 of the invention, in which the web thickness d was set to be 0.23×D, exhibited less thrust force and less horizontal force component, and enabled performance of more stable drilling. On the other hand, the drill 3 of the invention, in which the web thickness d was set to be 0.20×D, i.e., relatively small value, exhibited more thrust force due to less rigidity; however, its service life was sufficient for use in contrast to the comparison drill 5.

Figure 11:
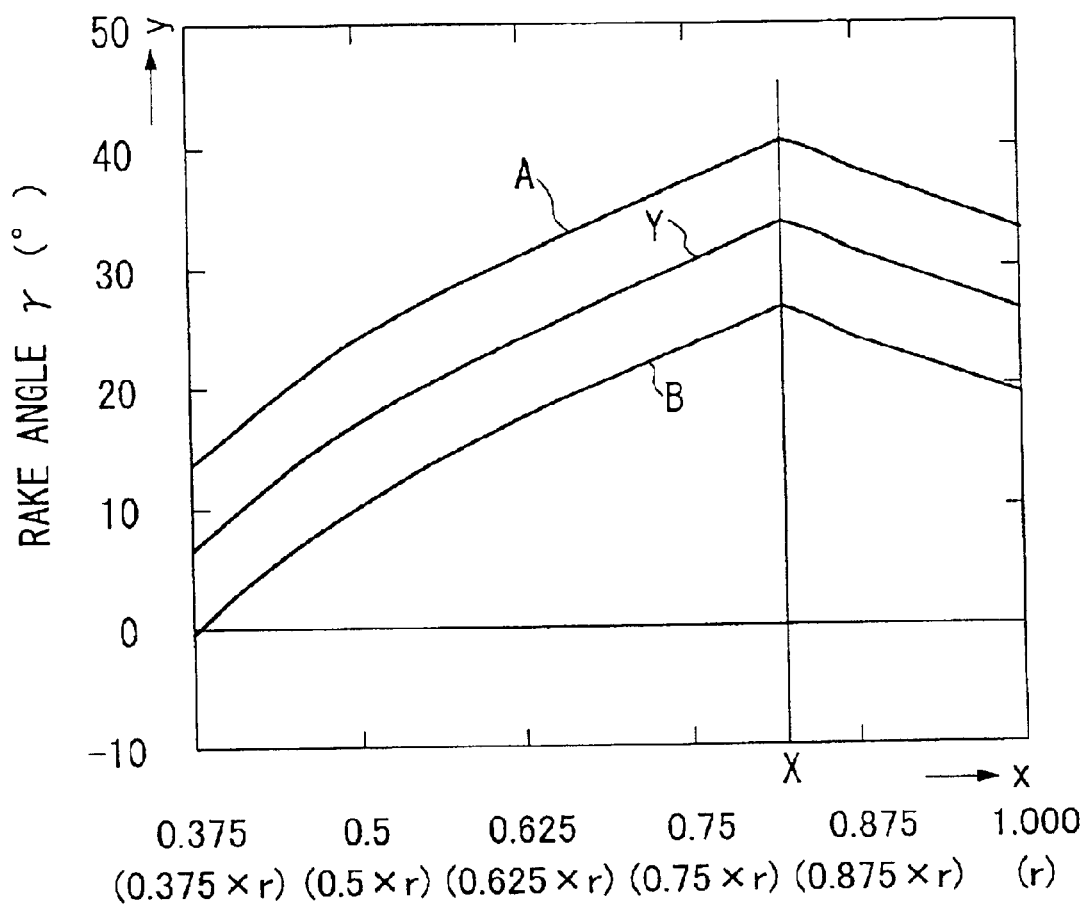
FIG. 11 is a graph showing the change in the rake angle (line Y) of the cutting edge in the drill according to the first embodiment, together with its preferable range of ±7° (lines A and B).

The first embodiment will be further explained below from a secondary aspect. In the drill according to this embodiment, the rake angle γ of the cutting edge 5, when viewed in cross section perpendicular to the cutting edge 5, i.e., the orthogonal rake angle of the cutting edge, 5 is generally designed so as to gradually increase in accordance with the radius of rotation up to a transition point X on the cutting edge 5, and then to gradually decrease to the periphery of the drill main body 1. As shown in FIGS. 5 to 10, the rake angle γ is defined at a point on the cutting edge 5, when viewed in cross section perpendicular to the cutting edge 5 at the point, by a curve corresponding to the first convex surface 7 or the first concave surface 8 of the wall surface 4 extending from the cutting edge 5 as the rake face and a reference plane including the rotation of axis O and passing through the point on the cutting edge 5. As shown in FIG. 11, the rake angle γ is designed so as to gradually increase in accordance with the radius of rotation up to the transition point X on the cutting edge 5 at which the rake angle γ is maximized, and then to gradually decrease to the periphery of the drill main body 1.

In this embodiment, the transition point X is set to be the inflection point between the concave cutting edge 16 and the convex cutting edge 17, as shown in FIG. 1. In other words, the transition point X is defined by moving the point of contact P1 between the convex and concave lines, when viewed in cross section perpendicular to the axis of rotation O, which respectively correspond to the convex surface 7 and the concave surface 8, toward the tip along the spiral of the chip discharge flute 3. In this case, the transition point X is positioned at a point on the cutting edge 5 where the distance from the axis of rotation O is 0.826×r (x=0.826) with respect to the maximum radius of rotation r. The rake angle γ is set to be the maximum value of 33° at the transition point X, as shown FIG. 8.

When the cutting edge 5 is designed to be a curved shape as in this embodiment in which the convex and concave cutting edges 16 and 17 exhibit an S-shaped curve, the plane perpendicular to the cutting edge 5 is defined as a plane perpendicular to the tangent line to the curve at a point on the curve. When the included angle is applied to the drill by forming the tip flank 2 in a conical shape, the plane perpendicular to the cutting edge 5 is defined as the plane obliquely extending relative to the axis of rotation O. As in this embodiment, when the thinning cutting edge 19 is formed along inner portion of the cutting edge 5, the rake angle γ need not gradually increase toward outside. In other words, the rake angle γ may gradually increase and then decrease except for the area of the thinning cutting edge 19. Depending on the web thickness d of the drill main body, the rake angle γ may gradually increase and then decrease in the area where the ratio x of the radius of rotation to the maximum radius of rotation is more than 37.5%, i.e., where the distance from the axis of rotation O is more than 0.375×r (x=0.375) with respect to the maximum radius of rotation r.

In the drill of this embodiment, because the rake angle γ of the cutting edge 5, when viewed in cross section perpendicular to the cutting edge 5, i.e., the orthogonal rake angle of the cutting edge 5, is generally designed so as to gradually increase in accordance with the radius of rotation up to a transition point X on the cutting edge 5, and then to gradually decrease to the periphery of the drill main body 1, except for the thinning cutting edge 17, and because the cutting ability of the cutting edge 5 is improved as the rake angle γ increases inside the transition point X although the cutting resistance gradually increases due to the cutting speed increased in accordance with the radius of rotation, it is possible to prevent an excessive torque from being applied to the drill main body 1, and to prevent breakage or an excessive wear of the drill main body 1. On the other hand, because rake angle γ decreases outside the transition point X, and because, in contrast, the included angle of the cutting edge increases, it is possible to ensure a sufficient strength of the cutting edge 5 near the peripheral point 15 where the maximum cutting resistance is applied to the cutting edge 5, and to prevent chipping, breakage, or rapid flank wear of the drill. Accordingly, the drill of the present invention enables performance of smooth and stable drilling for a sufficient period without having rapid wear or breakage of the drill, which will cause a shortened drill life, even under severe conditions such as during high speed and dry drilling. The hard coating, such as TiN, TiCN, TiAl, or the like, on the tip portion of the drill main body including the cutting edge may further contribute to preferably extend the drill life.

The position of the transition point X is preferably set a point at which the distance from the axis of rotation O is in a range from 70% to 90% of the maximum radius of rotation r of the cutting edge 5. When the transition point X is set at a point whose radius of rotation is less than 70% of the maximum radius of rotation r, the cutting resistance may not be preferably restricted because the rake angle γ gradually increases along a relatively short length of the cutting edge 5, and in contrast, the rake angle γ gradually decreases along a relatively long length of the cutting edge 5. On the other hand, when the transition point X is set at a point whose radius of rotation is greater than 90% of the maximum radius of rotation r, a sufficient strength of the cutting edge 5 may not be ensured near the peripheral point 15 where the maximum cutting resistance is applied to the cutting edge 5, specifically during a high speed and dry drilling, because the rake angle y gradually decreases along a relatively short length of the cutting edge 5.

In this embodiment, because the cutting edge 5 comprises, in the portion near the peripheral point 15, the convex cutting edge 16 protruding in the direction of drill rotation T, and the concave cutting edge 17 having concave shape, smoothly extending from the convex cutting edge 16 toward the inside, it is possible to ensure a sufficient strength of the convex cutting edge 16, i.e., of the cutting edge 5 near the peripheral point 15 where the maximum cutting resistance is applied to the cutting edge 5 due to the radial rake angle of the cutting edge 5 which gradually increases in the negative side in accordance with the radius of rotation. In addition, because the intersecting angle at the peripheral point 15 where the cutting edge 5 intersects the margin portion 6 is set to be large, a sufficient strength of the drill main body 1 at the peripheral point 15 is ensured, and breakage or chipping of the cutting edge 5 at the peripheral point 15 can be preferably prevented. On the other hand, a smooth curve is formed from the concave cutting edge 17 to the periphery via the convex cutting edge 16, whereby the chips are not broken between the outer portion and the inner portion thereof, are sufficiently curled by the effect of the concave cutting edge 17, flow toward the inside, and can be smoothly discharged, unlike the drill disclosed in Japanese Unexamined Patent Application, First Publication, No. 2000-198011, in which an outer corner cutting edge obliquely extends in the direction opposite to the direction of drill rotation from the end of the major cutting edge at a certain radius of rotation, whereby the chips are broken between the outer portion and the inner portion thereof.

In this embodiment, the transition point X is positioned at the inflection point where the convex cutting edge 16 is smoothly connected to the concave cutting edge 17, at which transition in the rake angle γ of the cutting edge 5 from a gradual increase to a gradual decrease occurs. Although the stress in the cutting edge 5 tends to concentrate at the transition portion of the rake angle γ of the cutting edge 5, it is possible to disperse the stress, and to prevent breakage of the cutting edge 5 due to a stress concentration, because the transition point X is positioned at the inflection point where the convex cutting edge 16 is smoothly connected to the concave cutting edge 17, in contrast to when the transition point X is positioned at the top portion of the convex cutting edge 16, or at the bottom portion of the concave cutting edge 17.

The transition point X is preferably positioned at a point at which the distance from the axis of rotation O is in a range from 70% to 90% of the maximum radius of rotation r of the cutting edge 5, and is also preferably positioned corresponding to the point of contact P1 at which the convex line corresponding to the first convex surface 7 is connected to the concave line corresponding to the first concave surface 8, while the point of contact P1 is preferably located outside the circle having its center at the axis of rotation O and whose diameter equals to ⅔ of the outer diameter D of the cutting edge 5, and more preferably, is located outside the circle having its center at the axis of rotation O and whose diameter equals to ⅚ of the outer diameter D; therefore, the transition point X is more preferably positioned at a point at which the distance from the axis of rotation O is in a range from 70% to 83% of the maximum radius of rotation r of the cutting edge 5. However, the transition point X need not be positioned exactly at the inflection point where the convex cutting edge 16 is smoothly connected to the concave cutting edge 17, and may be positioned around the inflection point, unless it is positioned at the top portion of the convex cutting edge 16, or at the bottom portion of the concave cutting edge 17.

The change in the rake angle γ is shown as the line Y in FIG. 11, and in the drill of this embodiment, the rake angle γ is preferably set in the range between the lines A and B in FIG. 11. In other words, the rake angle is preferably set in a range of y±7° at a point where the ratio of its radius of rotation to the maximum radius of rotation r is in a range from 37.5% to 82.6%, where y is derived from the following equation:

$y=-3.958x^4+39.987x^3-151.2x^2+267.22x-169.17$ (equation 1), where x is the radius ratio; and the rake angle is preferably set in a range of y±7° at a point where the ratio is in a range from 82.6% to 100%, where y is derived from the following equation: $y=-10.579x+68.733$ (equation 2).

When the rake angle γ of the cutting edge is set above the range of y+7°, where y is derived from the equation 1 or 2, the included angle of the cutting edge becomes too small where the rake angle γ is large, which may cause breakage of the cutting edge, specifically under high speed and dry drilling conditions. On the other hand, when the rake angle γ of the cutting edge is set below the range of y−7°, where y is derived from the equation 1 or 2, the cutting resistance is increased at that point, which may cause rapid wear of the cutting edge and an excessive driving torque for drilling.

Figure 12:
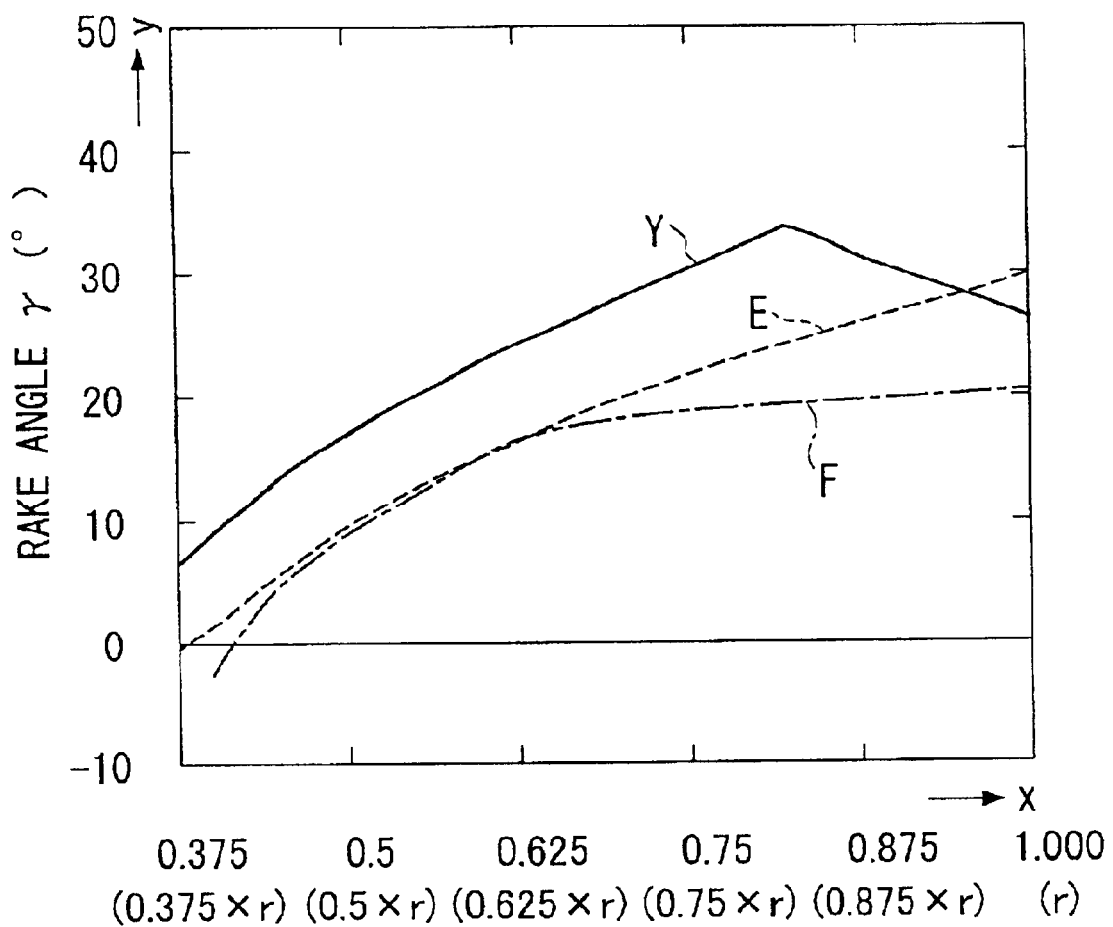
FIG. 12 is a graph showing the change in the rake angle (line Y) of the cutting edge in the drill Y according to the first embodiment, together with the changes in the rake angle (lines E and F) of the cutting edge in the comparison drills E and F.

Table 2 shows drill life test results in which the drill Y according to the present invention, a comparison drill A in which the rake angle γ of the cutting edge was set above the range of y+7°, a comparison drill B in which the rake angle γ of the cutting edge is set below the range of y−7°, a comparison drill E according to Japanese Patent No. 2674124, and a comparison drill F according to Japanese Unexamined Patent Application, First Publication, No. 2000-198011 were compared in drilling at the cutting speeds Vc of 80 m/min and 150 m/min. FIG. 12 shows the change lines Y, E, and F of the rake angle γ, respectively corresponding to the drills Y, E, and F.

The outer diameters of the cutting edge of the drills Y, A, B, E, and F were all 8 mm, and these drills were used for making through holes with depth 1 d of 25 mm in workpieces made of carbon steel S50C containing 0.5% carbon at a feed rate fr of 0.2 mm/rev; then, drill life of each drill was evaluated by measuring the total drilling length until reaching the end of service life. The test was started under dry conditions; however, because the drills E and F broke even at the cutting speed vc of 80 m/min, precluding comparison, all drills were tested with water-miscible cutting fluid. In Table 2, "○" means that the drill exhibited normal wear and could still be used after making 4000 holes, i.e., the total drilling length was about 100 m, "Δ" means that the drill exhibited normal wear, but its service life ended earlier than the drills with the symbol "○", and "×" means that the drill exhibited abnormal wear and that the service life ended at that point (causes of the end of service life are also appended).

TABLE 2

| | Results | |
|---|---|---|
| Drills | vc = 80 (m/min) | vc = 150 (m/min) |
| Y | ○ | ○ |
| A | ○ | Δ (70%) |
| B | Δ (70%) | Δ (85%) |
| B | Δ (70%) | X: Shoulder chipping |
| F | Δ (70%) | X: Quick breakage |

As shown in Table 2, the drills E and F exhibited drill lives at 70% of that of the drills Y and A even at the cutting speeds vc as low as 80 m/min, and these drills exhibited substantially shortened lives at the cutting speeds vc as high as 150 m/min due to breakage of the drill main body itself or chipping at the shoulder portion of the drill main body, i.e., at the intersecting portion where the periphery of the cutting edge intersects the margin portion. On the other hand, the drill Y according to the present invention could still be used after making 4000 holes at cutting speeds vc of 80 m/min, and even at high speed drilling in which the cutting speed vc was as high as 150 m/min. In addition, even the drills A and B whose rake angles y change in the zones above the line A or below the line B exhibited preferable service life extension, although their lives were shorter than that of the drill Y, because the rake angles γ were gradually increased and then gradually decreased toward the peripheries. Furthermore, the drill Y according to the present invention exhibited neither abnormal wear nor breakage until making 4000 holes, even when used under dry drilling conditions.

In this embodiment, the cutting edge 5 comprises the convex cutting edge 16 from which the first convex surface 7 on the wall surface 4 of the chip discharge flute 3 facing in the direction of drill rotation T extends, and the concave cutting edge 17 from which the first concave surface 8 on the wall surface 4 extends; therefore, the chips produced by the cutting edge 5 continuously all along the cutting edge 5 are carried toward the inside, are curled by being abutted against the first concave surface 8, and are discharged toward the shank of the drill in accordance with drill rotation. Because the second concave surface 12 on the wall surface 9 of the chip discharge flute 3 facing in the direction opposite to the direction of drill rotation T smoothly extends from the first concave surface 8, the chips curled by the first concave surface 8 are smoothly discharged. Furthermore, in this embodiment, because the second convex surface 11 smoothly extends from the second concave surface 12, the chips are discharged without being inhibited by the heel portion 10, and a sufficient strength of the drill main body 1 at the heel portion 10 can be preferably ensured.

Figure 13:
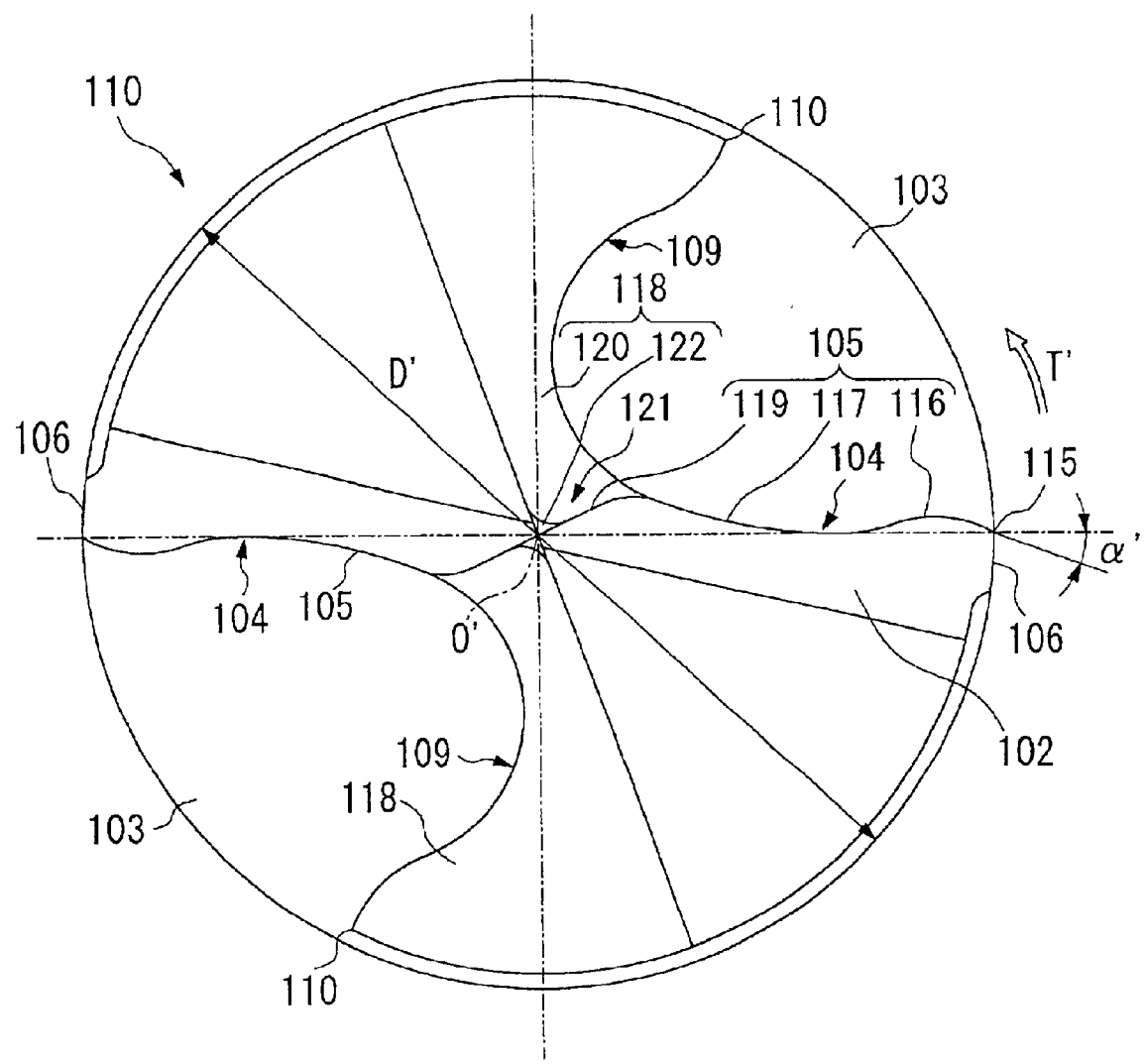
FIG. 13 is a front view showing a drill according to a second embodiment of the present invention when viewed in the axis of rotation.
Figure 14:
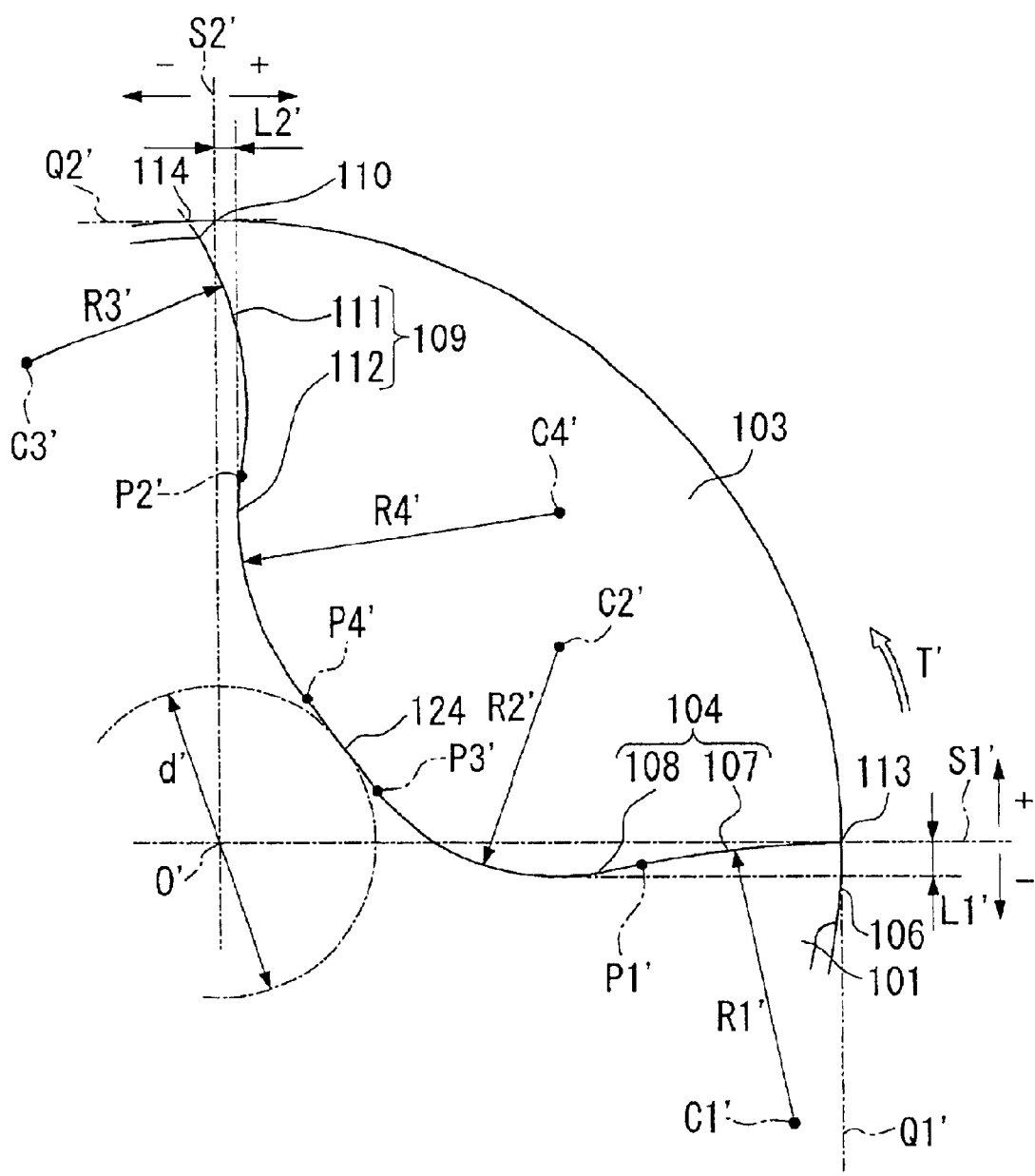
FIG. 14 is a cross-section of the drill shown in FIG. 13 taken along a plane perpendicular to the axis of rotation.
Figure 15:
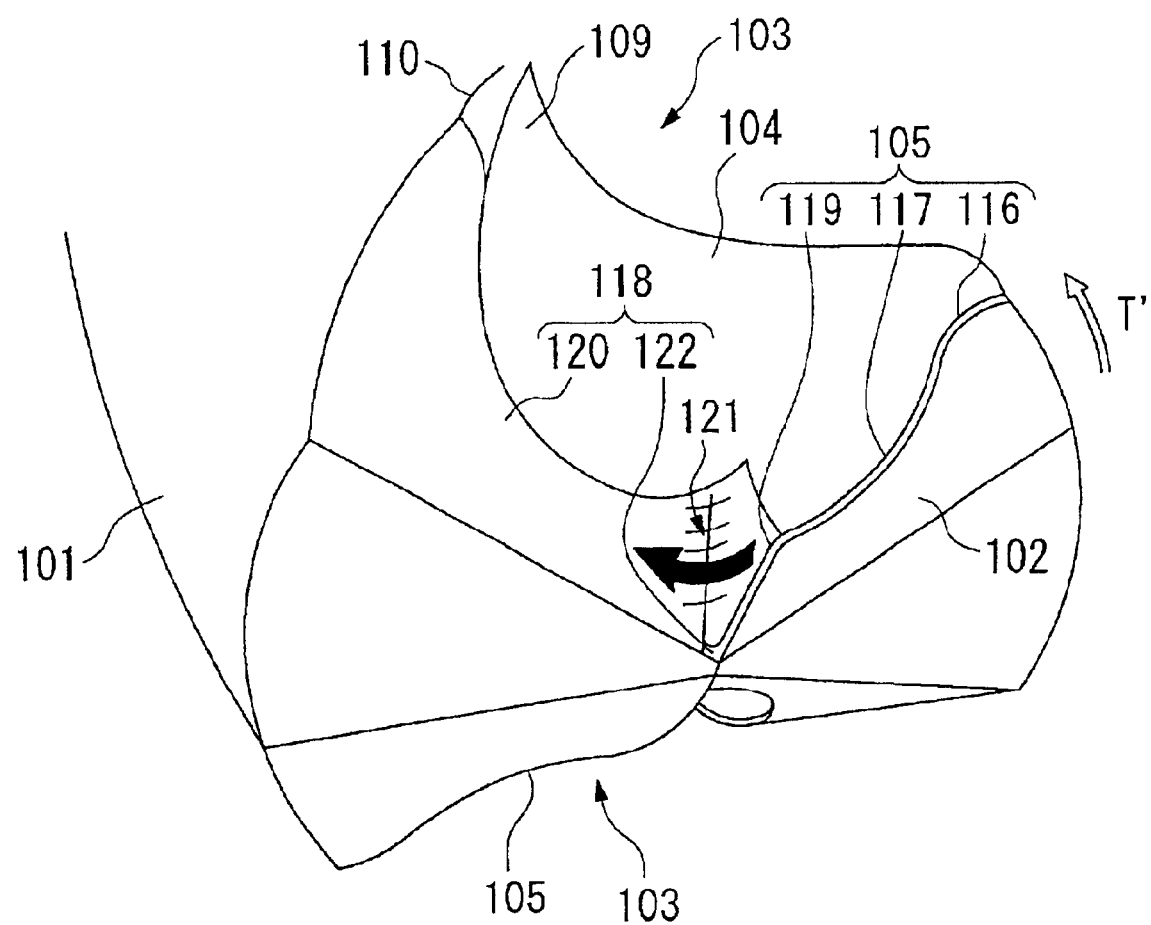
FIG. 15 is a perspective view of the tip portion of the drill shown in FIG. 13, specifically showing a thinning portion thereof.

The second embodiment of the present invention will be explained below with reference to FIGS. 13 to 15. As shown in FIG. 13, the wall surface 104 comprises a first convex surface 107 located near the periphery, intersecting with a margin portion 106, and seen as a convex line protruding in the direction of rotation when viewed in cross section perpendicular to the axis of rotation O' as shown in FIG. 14, and a first concave surface 108 located inside the first convex surface 107 and seen as a concave line when viewed in the above-mentioned cross section. The convex line corresponding to the first convex surface 107 is smoothly connected to the concave line corresponding to the first concave surface 108 at a point of contact P1'. In this embodiment, the wall surfaces 109 of the chip discharge flutes 103 facing in the direction opposite to the direction of drill rotation T' comprises a second convex surface 111 located near the periphery, extending to a heel portion 110, and seen as a convex line protruding in the direction opposite to the direction of drill rotation T' when viewed in the above-mentioned cross section, and a second concave surface 112 located inside the second convex surface 111 and seen as a concave line when viewed in the above-mentioned cross section. The convex line corresponding to the second convex surface 111 is smoothly connected to the concave line corresponding to the second concave surface 112 at a point of contact P2'. In addition, there is provided a connection surface 124 between the first concave surface 108 and the second concave surface 112. The first concave surface 108 and the second concave surface 112 are smoothly connected to each other via the connection surface 124. When viewed in cross section perpendicular to the axis of rotation O', the connection surface 124 is connected to both the concave lines respectively corresponding to the first and second concave surfaces 108 and 112 as a tangent line at points of contact P3' and P4'. Because the chip discharge flute 3 is formed in twisted shape, the connection surface 124 is a twisted surface which is twisted similar to the chip discharge flute 3 toward the shank of the drill. The outer surface of a land extending in the direction opposite to the direction of drill rotation from the margin portion 106 to the heel portion 110 is formed cylindrical having a step from the margin portion 106 toward the inside.

Furthermore, in this embodiment, the first convex and concave surfaces 107 and 108, and the second convex and concave surfaces 111 and 112 are formed so as to be seen as arcs in the above-mentioned cross section whose centers are respectively located at points C1' to C4', and whose radiuses are respectively set as radiuses R1' to R4'. The center C1' of the arc corresponding to the first convex surface 107 is located toward the inside with respect to a line Q1' which is the tangent line at a peripheral point 113 in the margin portion 106, i.e., at the intersection of the first convex surface 107 and the margin portion 106. The center C3' of the arc corresponding to the second convex surface 111 is located toward the inside with respect to a line Q2' which is the tangent line at the intersection 114 of a circle defined by rotating the peripheral point 113 around the axis of rotation O' and an extended line from the arc corresponding to the second convex surface 111. Consequently, the first convex surface 107 protrudes in the direction of rotation T' from a first imaginary line S1' defined by connecting the axis of rotation O' and the peripheral point 113 in the wall surface 104, and the tangent line to the first convex surface 107 passing the peripheral point 113 extends outwardly and obliquely with respect to the first imaginary line S1' in the direction opposite to the direction of drill rotation T' and defines an obtuse angle with the line Q1' perpendicularly intersecting the first imaginary line S1'. The second convex surface 111 protrudes in the direction opposite to the direction of drill rotation from a line defined by connecting the axis of rotation O' and the intersection of the second convex surface 111 and the heel portion 110.

Because the arcs respectively corresponding to the first and second concave surfaces 108 and 112 contact with the tangent line corresponding to the connection surface 124 at the points of contact P3' and P4', the centers C2' and C4' of the arcs are respectively located on straight lines which are parallel to each other and which perpendicularly intersect the tangent line at P3' and P4', respectively. In this embodiment, the connection surface 124 is located at the bottom of the chip discharge flute 103; therefore, the circle with its center at the axis of rotation O' and being tangent to the connection surface 124 defines the web thickness circle of the drill main body 1. The diameter d', i.e., the web thickness d' of the drill main body 101 is preferably set in a range from 0.15×D' to 0.3×D', where D' is the diameter of the circle defined by rotating the periphery point 115 of the cutting edge 105 around the axis of rotation O', i.e., the outer diameter of the cutting edge 105.

The point of contact P1' at which the convex line corresponding to the first convex surface 107 is connected to the concave line corresponding to the first concave surface 108 is preferably located outside the circle having its center at the axis of rotation O' and whose diameter equals to ⅔ of the outer diameter D' of the cutting edge 105, and more preferably, located outside the circle having its center at the axis of rotation O' and whose diameter equals to ⅚ of the outer diameter D'. When viewed in cross section perpendicular to the axis of rotation O', the amount of concavity of the first concave surface 108 is preferably set such that the offset L1' between the first imaginary line S1' and the bottom of the first concave surface 108 falls in a range from −0.06×D' to 0, and the amount of concavity of the second concave surface 112 is preferably set such that the offset L2' between the second imaginary line S2' and the bottom of the second concave surface 112 falls in a range from −0.06×D' to 0.06×D', where D' is the outer diameter of the cutting edge 105. The offset L1' is defined, in cross section, as the distance between the first imaginary line S1' and the line which is parallel to the first imaginary line S1' and which contacts the concave line corresponding to the first concave surface 108, and the offset L1' is measured as a positive value in the direction of drill rotation T', as shown in FIG. 14. Similarly, the offset L2' is defined, in cross section, as the distance between the second imaginary line S2' and the line which is parallel to the second imaginary line S2' and which contacts the concave line corresponding to the second concave surface 108, and the offset L2' is measured as a positive value in the direction opposite to the direction of drill rotation T,' as shown in FIG. 14. In this embodiment, the entirety of the first concave surface 108 will not be located in the area defined with respect to the imaginary line S2' in the direction of drill rotation T'.

Furthermore, when viewed in the above-mentioned cross section, the radiuses of curvature R1' to R4' of the arcs corresponding to the first convex and concave surfaces 107 and 108, and second convex and concave surfaces 111 and 112, respectively, are preferably set such that the radius R1' of the first convex surface 107 falls in a range from 0.1×D' to 0.8×D', where D' is the outer diameter of the cutting edge 105, the radius R2' of the first concave surface 108 falls in a range from 0.18×D' to 0.35×D', the radius R3' of the second convex surface 111 falls in a range from 0.1×D' to 0.8×D', and the radius R4' of the second concave surface 112 falls in a range from 0.2×D' to 0.5×D'. Specifically, in this embodiment, the radius R4' of the second concave surface 112 is set to be greater than the radius R2' of the first concave surface 108. In this embodiment, the ratio of the depth of the chip discharge flute to the width thereof is preferably set to be 0.8–1.2:1.

The cutting edge 105 is formed along the intersecting ridge where the wall surface 104 of the chip discharge flute 103 intersects the tip flank 102, and the wall surface 104 comprises the first convex and concave surfaces 107 and 108. The cutting edge 105 comprises, in the portion near the peripheral point 115, the convex cutting edge 116 protruding in the direction of drill rotation T', from which the first convex surface extends toward the shank, and the concave cutting edge 117 having concave shape and located inside the convex cutting edge 116, from which the first concave surface 108 extends toward the shank, as shown in FIG. 13; and thus, the cutting edge 105 exhibits a slightly curved S-shape including the convex cutting edge 116 and the concave cutting edge 117, when viewed from the axis of rotation O'. Because the cutting edge 105 has an included angle defined by the inclination of the tip flank 102 toward the shank of the drill main body 101 in accordance with the radius of rotation from inside to the periphery, and because the chip discharge flutes are formed in a spiral shape, the shape of the combined S-shaped curve presented by the convex and concave cutting edges 116 and 117, when viewed from the axis of rotation O', is defined by shifting each point on the combined curve corresponding to the first convex and concave surfaces 107 and 108 of the wall surface 104, when viewed in cross section perpendicular to the axis of rotation O', in the direction of drill rotation T' by the distance gradually increasing as the radius of rotation decreases. The tangent line to the convex cutting edge 116 at the peripheral point 115, when viewed from the axis of rotation O', extends outwardly and more obliquely in the direction opposite to the direction of drill rotation T', than in the case of the tangent line to the convex line corresponding to the first convex surface at the peripheral point 113, when viewed in the above-mentioned cross section; and thus, the radial rake angle α of the cutting edge 105 at the peripheral point 115 is set to be a negative value.

A thinning portion 118 is formed in the area where the wall surfaces 104 and 109 of the chip discharge flute 103 merge with the tip of the drill by cutting out material near the intersecting ridge where the first concave surface 108, the second concave surface 112, and the second convex surface 111 intersect the tip flank, such that the cut surface inclines and faces inside the chip discharge flute 103, and the thinning portion 118 extends to the heel portion 110. The inner portion of the cutting edge 105 is a thinning cutting edge 119 which is formed along the intersecting ridge where the thinning portion 118 intersects the tip flank 102, and which extends from the inner end of the concave cutting edge 117 toward the axis of rotation, i.e., the center of the tip flank 102. In the cutting edge 105, the thinning cutting edge 119 is smoothly connected to the concave cutting edge 117 via a convex curve or straight lines protruding in the direction of drill rotation T', when viewed from the axis of rotation O'.

The thinning portion 118 includes a first thinning portion 120 which is defined by a surface intersecting the wall surfaces 104 and 109 of the chip discharge flute 103. The first thinning portion 120 comprises a plane portion which intersects the wall surface 109 of the chip discharge flute 103 facing in the direction opposite to the direction of drill rotation T,' and which extends toward the heel portion 110, and a concave portion with a rounded bottom 121, as shown in FIG. 14 which is located near the boundary between the wall surface 109 and the wall surface 104 facing in the direction of drill rotation T', and which extends from the connection surface 124 toward the center of the tip flank 2. The rounded bottom 121 extends from the wall surfaces 104 and 109 toward the inner end of the cutting edge 105, i.e., the inner end of the thinning cutting edge 119, while inclining toward the center of the drill main body 101. The radius of curvature, in cross section, of the rounded bottom 121 of the first thinning portion is preferably set in a range from 0.1 mm to 0.5 mm. This radius of curvature may be set to change so as to gradually increase as positioned toward the shank of the drill main body 101.

In addition, a second thinning portion 122 having a recessed shape and being much shorter than the first thinning portion 120 is formed between the inner end of the first thinning portion and the very center of the tip portion of the drill main body 101. The bottom of the second thinning portion 122 extends from the rounded bottom 121 of the first thinning portion 120 to the inner end of the cutting edge 105, while inclining differently than in the case of the rounded bottom 121. The inner end of the cutting edge 105 is formed along the intersecting ridge where the second thinning portion 122 intersects the tip flank 102. The radius of curvature of the bottom of the second thinning portion 122 is preferably set to be less than that of the rounded bottom 121 of the first thinning portion 120, and specifically, less than 0.1 mm. The radius of curvature may even be zero, i.e., the bottom of the second thinning portion 122 may be of a V-shape. The radius of curvature may be set to change so as to gradually increase as positioned toward the shank of the drill main body 101, as similar to that of the rounded bottom 121 of the first thinning portion 120. By forming the inner end of the cutting edge 105 along the intersecting ridge where the second thinning portion 122, which inclines more than the first thinning portion 120, intersects the tip flank 102, the width of the chisel defined between a pair of the cutting edges 105 at the center of the tip flank 102 becomes shorter than in the case in which the inner end of the cutting edge 105 is formed by intersecting the first thinning portion 120 with the tip flank 102. In this embodiment, the width of the chisel is set in a range from 0 to 0.2 mm, which means that the ends of a pair of cutting edges 105 may coincide with each other at the axis of rotation O'.

The operation of the drill having the construction described above will be explained below from a primary aspect. The intersecting angle of the wall surface 104 of the chip discharge flute 103 and the margin portion 106 may be set to be large by forming the first convex surface 107 on the wall surface 104 toward the peripheral point 113, whereby a sufficient strength of the drill main body 101 at the peripheral point 113 can be ensured, and a sufficient drill life is ensured without having breakage or chipping at the peripheral point 113 under severe drilling conditions, such as during high speed and dry drilling. In addition, because the first concave surface 108 smoothly extends from the first convex surface 107 toward the inside, the entire chip including the outer portion flowing on the first convex surface 107 can be preferably curled and directed toward the inside while being guided along the first concave surface 108, even when the chips produced by the first convex surface 107 try to move out.

Furthermore, because the chip discharge flute 102 comprises the second concave surface 112 formed on the wall surface 9 of the chip discharge flute 103 facing in the direction opposite to the direction of drill rotation T', and the connection surface 124 smoothly connected to both the first and the second concave surfaces 108 and 112 is formed between the first and the second concave surfaces 108 and 112, the chips are generally curled and can be smoothly discharged without being excessively abutted against the second concave surface 112 and the connection surface 124, and being broken. Because the chips will not be excessively abutted against the second concave surface 112, rapid wear of the wall 109 of the chip discharge flute 103 due to abutment and an increase in driving torque can be preferably prevented. In this embodiment, because the second convex surface 111 smoothly extends from the second convex surface 112 toward the periphery, the heel portion 110 will not inhibit the flow of chips; thus, a sufficient strength of the drill main body 1 at the heel portion 110 can be preferably ensured. The hard coating, such as TiN, TiCN, TiAl, or the like, on the tip portion of the drill main body including the cutting edge may further contribute to preferably extend the drill life.

In addition, forming the connection surface 124 between the first and second concave surfaces 108 and 112 makes it possible to have the chip discharge flute 103 with a sufficient width without being restricted by the radiuses of curvature of the first and second concave surfaces 108 and 112. Accordingly, when the chips tend to be curled tightly, depending on material of the workpiece, it is possible to make the radiuses R2' and R4' of the first and second surfaces 108 and 112 to be large without making the width of the chip discharge flute 103 to be too wide and without loosing a sufficient rigidity of the drill main body 1, by making the width of the connection surface 124 to be narrower. On the other hand, when the chips tend to be barely curled, it is possible to make the radiuses R2' and R4' of the first and second surfaces 108 and 112 to be small so that the chips are sufficiently curled without making the width of the chip discharge flute 103 to be too narrow and without loosing a sufficient chip discharge performance, by making the width of the connection surface 124 to be wider.

In this embodiment, with regard to the first concave surface 108, the offset L1' between the first imaginary line S1', which is defined by connecting the axis of rotation O' and the peripheral point 113 of the wall surface 104 of the chip discharge flute 103, and the bottom of the first concave surface 108 is preferably set in a range from −0.06×D' to 0 (the offset L1' is measured as a positive value in the direction of drill rotation T'), and with regard to the second concave surface 112, the offset L2' between the second imaginary line S2', which perpendicularly intersects the first imaginary line S1' at the axis of rotation O', and the bottom of the second concave surface 112 is preferably set in a range from −0.06×D' to 0.06×D' (the offset L2' is measured as a positive value in the direction opposite to the direction of drill rotation T'), where D' is the outer diameter of the cutting edge 105, whereby an appropriate braking effect may be applied to the chips by moderately abutting the chips against the first and second concave surfaces 108 and 112. Therefore, the chips may be sufficiently curled and discharged while preventing clogging of the chips and an increase in driving torque due to an excessive braking effect. In order to ensure such advantageous effects, the radius R2' of the concave line corresponding to the first concave surface 108 is preferably set in a range from 0.18×D' to 0.35×D', and the radius R4' of the concave line corresponding to the second concave surface 112 is preferably set in a range from 0.2×D' to 0.5×D', when viewed in cross section perpendicular to the axis of rotation O', where D' is the outer diameter of the cutting edge 105.

In this embodiment, when viewed in cross section perpendicular to the axis of rotation O', the radius of curvature R4' of a concave line corresponding to the second concave surface 112 is greater than the radius of curvature R2' of a concave line corresponding to the first concave surface 108. Accordingly, it is possible to make the chips produced by the cutting edge 105 to be sufficiently curled by the first concave surface 108, and to smoothly carry these chips to the second concave surface 112 with a relatively large radius R4' via the connection surface 124, without making the chips to be excessively abutted against the second concave surface 112 or the connection surface 124. Thus, the chips are smoothly discharged and the driving torque for drilling may be preferably reduced.

The drilling test results of the drill according to the second embodiment should also be interpreted with reference to Table 1.

As described above, according to the first aspect of the present invention, because the cutting edge comprises the convex cutting edge, protruding in the direction of rotation, toward the periphery, the intersecting angle at the intersecting portion, i.e., the portion of the convex cutting edge at the periphery, where the convex cutting edge intersects the margin portion becomes large, whereby a sufficient strength of the cutting edge is ensured; thus, breakage or chipping of the drill can be prevented even under severe drilling conditions, such as during high speed drilling.

According to the second aspect of the present invention, because the chip discharge flute comprises the convex surface, protruding in the direction of rotation, toward the periphery, a sufficient strength of the drill can be ensured; thus, breakage or chipping of the drill can be prevented. In addition, because the chip discharge flute further comprises the first concave surface smoothly extending from the convex surface toward the inner portion, the entire chip including the outer portion flowing on the convex surface can be preferably curled and directed toward the inside while being guided along the first concave surface. Furthermore, because the chip discharge flute comprises the second concave surface formed on the wall surface of the chip discharge flute facing in the direction opposite to the direction of drill rotation, and a connection surface smoothly connected to both the first and the second concave surfaces is formed between the first and the second concave surfaces, the chips are generally curled and can be smoothly discharged without being excessively abutted against the trailing wall surface of the chip discharge flute; consequently, the drill main body is subjected to less frictional resistance during drilling, which leads to less wear on the drill and less driving torque required for the drill rotation. In addition, by setting the width of the connection surface to be appropriate, a sufficient rigidity of the drill main and a sufficient cross-section area of the chip discharge flute can be ensured, regardless of the radiuses of curvature of the first and second concave surfaces, Therefore, the drill life can be preferably extended even under severe drilling conditions, such as during high speed drilling, and smooth and stable drilling can be performed.

According to the third aspect of the present invention, because the chip discharge flute comprises the convex surface, protruding in the direction of rotation, toward the periphery, a sufficient strength of the drill main body can be ensured; thus, breakage or chipping of the drill can be prevented. In addition, because the chip discharge flute further comprises the first concave surface smoothly extending from the convex surface toward the inner portion, the entire chip can be preferably curled and directed toward the inside while being guided along the first concave surface. Furthermore, because the chip discharge flute comprises the second concave surface which is formed on the wall surface of the chip discharge flute facing in the direction opposite to the direction of drill rotation, and which is smoothly extended from the first concave surfaces, and the radius of curvature of the second concave surface is greater than that of the first concave surface, the chips are generally curled and can be smoothly discharged without being excessively abutted against the second concave surface; consequently, the drill main body is subjected to less frictional resistance during drilling, which leads to less wear on the drill and less driving torque required for the drill rotation. Therefore, the drill life can be preferably extended even under severe drilling conditions, such as during high speed drilling, and smooth and stable drilling can be performed.

According to the fourth aspect of the present invention, because the thinning portion extending from the end of the wall of the chip discharge flute to the inner portion the cutting edge comprises the first thinning portion in a recessed shape whose bottom portion is formed by a rounded concave surface and extends from the end of the wall of the chip discharge flute toward the inner end of the cutting edge, the inner portions of the chips are smoothly curled by the rounded concave surface in the bottom of the first thinning portion, and are carried into the chip discharge flute without clogging. In addition, by forming the second thinning portion extending from the inner end of the first thinning portion to the innermost point of the cutting edge, the bite performance of the drill on a workpiece may be preferably improved, thrust force may be preferably reduced due to a shortened chisel width, and a sufficient included angle of the tip portion of the drill main body and sufficient strength can be ensured; thus, the drill life can be preferably extended even under severe drilling conditions, such as during high speed drilling, and smooth and stable drilling can be performed. According to the fifth aspect of the present invention, because the rake angle of the cutting edge is gradually increased in accordance with the radius of rotation up to a transition point, and then gradually decreased toward the periphery of the drill main body, an excellent cutting ability can be ensured, the cutting resistance can be preferably reduced, and a sufficient strength of the cutting edge, specifically at the periphery where a great resistance is applied is ensured. Therefore, the drill life can be preferably extended even under severe drilling conditions, such as during high speed drilling, and smooth and stable drilling can be performed.

What is claimed is:

1. A drill, comprising:
   drill main body rotatable about an axis of rotation, and having a tip end with a tip flank and a shank;
   a chip discharge flute formed on a periphery of said drill main body, and extending from said tip end toward said shank of said drill main body;
   a cutting edge formed along an intersecting ridge where a wall surface of said chip discharge flute facing in the direction of drill rotation intersects said tip flank of said nil main body, wherein
      rake angle of said cutting edge, when viewed in cross section perpendicular to said cutting edge, is gradually increased in accordance with the radius of rotation up to a transition point, and then said rake angle is gradually decreased to the periphery of said drill main body.

2. A drill according to claim 1, wherein said rake angle is set in a range of y±7° at a point where the ratio of its radius of rotation to the maximum radius of rotation is in a range from 37.5% to 82.6%, where y is derived from the following equation:
   $y=-3.958x^4+39.987x^3-151.2x^2+267.22x-169.17$, where x is said ratio; and
   said rake angle is set in a range of y±7° at a point where said ratio is in a range from 82.6% to 100%, where y is derived from the following equation: $y=-10.579x+68.733$.

3. A drill comprising:
   a drill main body rotatable about an axis of rotation, and having a tip end with a tip flank and a shank;
   a chip discharge flute formed on a periphery of said drill main body, and extending from said tip end toward said shank of said drill main body; and
   a cutting edge formed along an intersecting ridge where a wall surface of said chip discharge flute facing in the direction of drill rotation intersects said tip flank of said drill main body, wherein
      said chip discharge flute comprises a convex surface toward the periphery, a first concave surface smoothly extending from said convex surface, and a second concave surface formed on a wall surface of said chip discharge flute facing in the direction opposite to the direction of drill rotation, and wherein
         connection surface is formed between said first concave surface and said second concave surface such that, when viewed in cross section perpendicular to said axis of rotation, said connection surface defines a tangent line being tangent to both of a concave line corresponding to said first concave surface and another concave line corresponding to said second concave surface, so as to smoothly connect said first concave surface and said second concave surface.

4. A drill, comprising:
   drill main body rotatable about an axis of rotation, and having a tip end with a tip flank and a shank;
   a chip discharge flute formed on a periphery of said drill main body, and extending from said tip end toward said shank of said drill main body; and
   a cutting edge formed along an intersecting ridge where a wall surface of said chip discharge flute facing in the direction of drill rotation intersects said tip flank of said nil main body, wherein
      said chip discharge flute comprises a first convex surface toward the periphery, a first concave surface smoothly extending from said first convex surface, a second concave surface which is formed on a wall surface of said chip discharge flute facing in the direction opposite to the direction of drill rotation and which smoothly extends from said first concave surface and a second convex surface smoothly extending from the second concave surface and facing in the direction opposite to the direction of drill rotation, and wherein,
         when viewed in cross section perpendicular to said axis of rotation, the radius of curvature of a concave line corresponding to said second concave surface is greater than that of a concave line corresponding to said first concave surface.

5. A drill comprising:
   a drill main body rotatable about an axis of rotation, and having a tip end with a tip flank and a shank;
   a chip, discharge flute formed on a periphery of said drill main body, and extending from said tip end toward said shank of said drill main body; and
   a cutting edge formed along an intersecting ridge where a wall surface of said chip discharge flute facing in the direction of drill rotation intersects said tip flank of said drill main body, wherein
      said chip discharge flute comprises a convex surface toward the periphery, a first concave surface smoothly extending from said convex surface, and a second concave surface which is formed on a wall surface of said chip discharge flute facing in the direction opposite to the direction of drill rotation and which smoothly extends from said first concave surface, and wherein,
         when viewed in cross section perpendicular to said axis of rotation, the radius of curvature of a concave line corresponding to said second concave surface is greater than that of a concave line corresponding to said first concave surface and
      wherein, when viewed in cross section perpendicular to said axis of rotation, an offset between a first imaginary line, which is defined by connecting said axis of rotation and an outermost point of said wall surface of said chip discharge flute facing in the direction of drill rotation, and the bottom of said first concave surface is set in a range from $-0.06\times D$ to 0, and an offset between a second imaginary line which perpendicularly intersects said first imaginary line at said axis of rotation, an the bottom of said second concave surface is set in a range from $-0.06\times D$ to $0.06\times D$, where D is the diameter of the drill main body.

6. A drill according to claim 3 or 4, wherein, when viewed in cross section perpendicular to said axis of rotation, the radius of curvature of a convex line corresponding to said convex surface is set in a range from $0.1\times D$ to $0.8\times D$, where D is the diameter of said drill main body.

7. A drill comprising:
   a drill main body rotatable about an axis of rotation, and having a tip end with a tip flank and a shank;
   a chip discharge flute formed on a periphery of said drill main body, and extending from said tip end toward said shank of said drill main body; and
   a cutting edge formed along an intersecting ridge where a wall surface of said chip discharge flute facing in the direction of drill rotation intersects said tip flank of said nil main body, wherein said chip discharge flute comprises a convex surface toward the periphery, a first concave surface smoothly extending from said convex surface, and a second concave surface which is formed on a wall surface of said chip discharge flute facing in the direction opposite to the direction of drill rotation and which smoothly extends from said first concave surface and wherein, when viewed in cross section perpendicular to said axis of rotation, the radius of curvature of a concave line corresponding to said second concave surface is greater than that of a concave line corresponding to said first concave surface and wherein, when viewed in cross section perpendicular to said axis of rotation, the radius of curvature of a concave line corresponding to said first concave surface is set n a range from 0.18×D to 0.35×D, where D is the diameter of said drill main body.

8. A drill according to claim 3 or 4, wherein, when viewed in cross section perpendicular to said axis of rotation, the radius of curvature of a concave line corresponding to said second concave surface is set in a range from 0.2×D to 0.5×D, where D is the diameter of said drill main body.

9. A drill, comprising:
a drill main body rotatable about an axis of rotation in a rotation direction, an having a tip end with a tip flank and a shank and a heel portion disposed at a outer periphery of said drill main body;
a chip discharge flute formed on a periphery of said drill main body, and extending from said tip end toward said shank of said drill main body;
a cutting edge formed along an intersecting ridge where a wall surface of said chip discharge flute facing in the direction of drill rotation intersects said tip flank of said nil main body; and
a thinning portion extending from the end of said wall of said chip discharge flute to the inner portion of said cutting edge, wherein
said thinning portion comprises a first thinning portion in a recessed shape whose bottom portion is formed by a rounded concave surface and extends from the end of said wall of said chip discharge flute toward the inner end of said cutting edge, the first thinning portion having a plane portion intersecting the wall surface facing in a direction opposite the rotation direction and extending towards the heel portion.

10. A drill according to claim 9, wherein the aperture angle of said first thinning portion is set in a range from 95° to 105°.

11. A drill according to claim 9, wherein the radius of curvature of a concave curve defined, in cross section, by said bottom portion of said first thinning portion is set in a range from 0.1 mm to 0.5 mm.

12. A drill according to claim 9, wherein said thinning portion further comprises a second thinning portion extending from the inner end of said first thinning portion to the innermost point of said cutting edge.

13. A drill according to claim 12, wherein said second thinning portion is formed in a recessed shape whose radius of curvature, in cross section, is smaller than that of the concave curve defined by said bottom portion of said first thinning portion.

14. A drill according to claim 12, wherein said second thinning portion is formed in a recessed shape whose radius of curvature, in cross section, is set to be less than 0.1 mm.

15. A drill according to claim 3, 4 or 9, wherein the web thickness of said drill main body is set in a range from 0.15×D to 0.3×D, where D is the diameter of said drill main body.

16. A drill according to claim 1, wherein said cutting edge comprises a convex cutting edge toward the periphery and a concave cutting edge smoothly extending from said convex cuffing edge, and wherein
said transition point is positioned at the inflection point between said convex cutting edge and said concave culling edge.

17. A drill according to claim 1, wherein the radius of rotation of sa transition point is set in a range from 70% to 90% of the maximum radius of rotation.

18. A drill according to claim 3, 4, 9, or 1, wherein a hard coating is coated on the surface of at least the tip portion of said drill main body.

* * * * *